United States Patent [19]
Dart et al.

[11] Patent Number: 5,566,951
[45] Date of Patent: *Oct. 22, 1996

[54] METHOD AND APPARATUS ENABLING ARCHERY PRACTICE

[75] Inventors: Peter J. Dart, Boulder; Howard F. Hall, Longmont; David A. Johnson, Littleton, all of Colo.

[73] Assignee: Dart International, Inc., Englewood, Colo.

[*] Notice: The term of this patent shall not extend beyond the expiration date of Pat. No. 5,328,190.

[21] Appl. No.: 265,303

[22] Filed: Jun. 24, 1994

Related U.S. Application Data

[63] Continuation-in-part of Ser. No. 926,539, Aug. 4, 1992, Pat. No. 5,328,190.

[51] Int. Cl.$^6$ ............... F41J 9/14; F41J 5/14; A63B 71/00
[52] U.S. Cl. ............ 273/358; 273/371; 273/416; 273/419; 273/454
[58] Field of Search ............... 273/313, 314, 273/315, 316, 358, 359, 371, 373, 408, 416, 419, 440, 454, 460

[56] References Cited

U.S. PATENT DOCUMENTS

| | | |
|---|---|---|
| 1,197,567 | 9/1916 | Weeks . |
| 3,411,785 | 11/1968 | Molina et al. . |
| 3,590,225 | 6/1971 | Murphy et al. . |
| 3,619,630 | 11/1971 | McLeod et al. . |
| 3,623,065 | 11/1971 | Rockwood et al. . |
| 3,727,069 | 4/1973 | Crittenden, Jr. et al. . |
| 3,807,858 | 4/1974 | Finch . |
| 4,222,564 | 9/1980 | Allen et al. . |
| 4,290,757 | 9/1981 | Marshall et al. . |
| 4,657,511 | 4/1987 | Allard et al. . |
| 4,678,194 | 7/1987 | Bowyer et al. . |
| 4,680,012 | 7/1987 | Morley et al. . |
| 4,763,903 | 8/1988 | Goodwin et al. . |
| 4,788,441 | 11/1988 | Laskowski . |
| 4,948,371 | 8/1990 | Hall . |
| 4,949,972 | 8/1990 | Goodwin et al. . |
| 5,020,806 | 6/1991 | Martin . |
| 5,194,006 | 3/1993 | Zaenglein . |
| 5,328,190 | 7/1994 | Dart et al. ............... 273/358 |

FOREIGN PATENT DOCUMENTS 1246271 9/1971 United Kingdom .

*Primary Examiner*—Jessica J. Harrison
*Assistant Examiner*—James Schaaf
*Attorney, Agent, or Firm*—F. A. Sirr; E. C. Hancock; Holland & Hart llp

[57] ABSTRACT

An archery practice device projects a moving hunt scene on a screen. In one embodiment of the invention, a continuous plane of IR light is located prior to the screen, an arrow carrying a reflector is detected as it penetrates this light plane, and IR illumination is reflected back toward the archer and a full-screen radiation detector. In another embodiment, a piezoelectric motion detector senses impact of an arrow on the screen, an IR source is momentarily triggered by the motion detector, and IR illumination is reflected by the arrow toward the full-screen radiation detector. The detector generates a full-screen signal indicating the point of arrow impact on the screen. Upon detecting the arrow, the moving scene is frozen on the screen. The visual content of the frozen scene is coordinated to the full-screen signal from the detector, whereupon a hit zone image is projected on the screen to indicate the arrow impact point relative to the frozen scene. The arrow does not penetrate the screen, and drops vertically downward adjacent to the bottom of the screen at a location between the front of the screen and the archer.

28 Claims, 11 Drawing Sheets

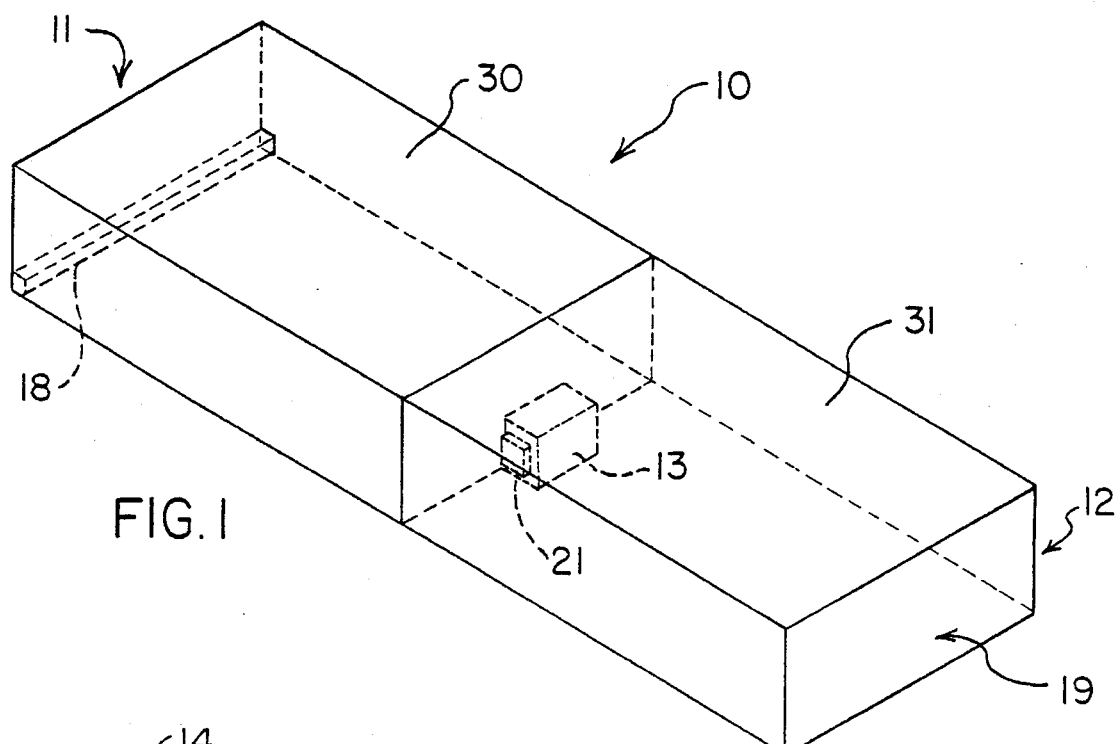
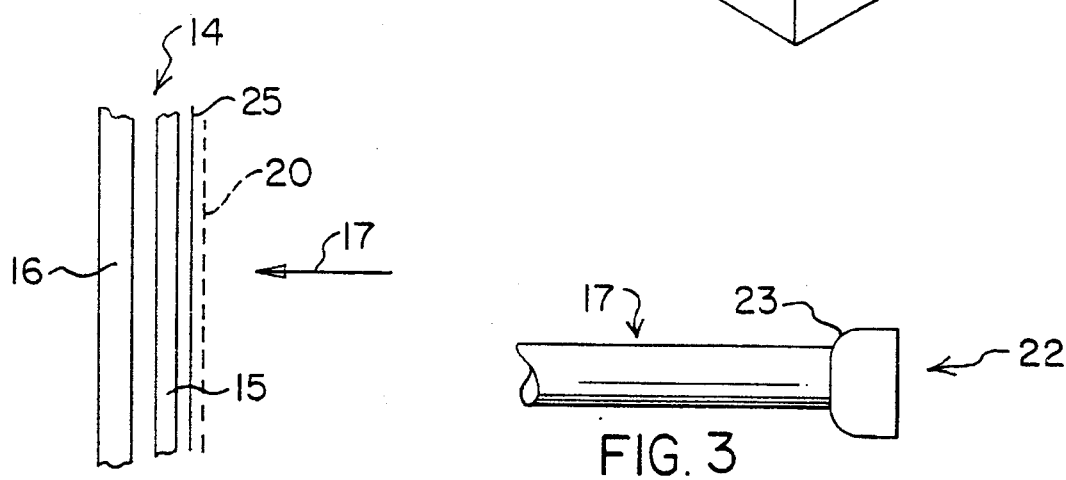
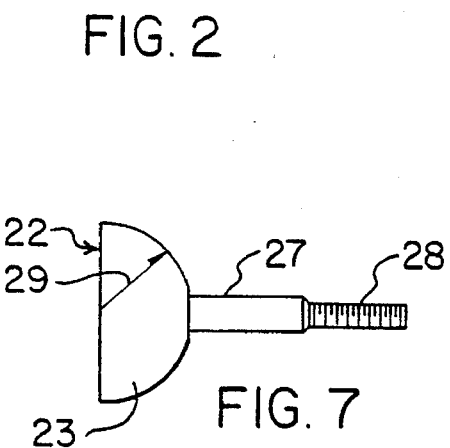
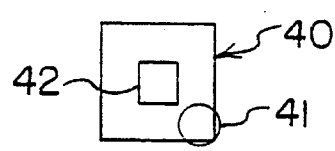

METHOD AND APPARATUS ENABLING ARCHERY PRACTICE

CROSS-REFERENCE TO RELATED APPLICATIONS

This application is a continuation in part of U.S. patent application Ser. No. 07/926,539, filed 4 Aug. 1992, entitled "Method and Apparatus Enabling Archery Practice", now U.S. Pat. No. 5,328,190.

BACKGROUND OF THE INVENTION

1. Field of the Invention

This invention relates to the field of target shooting, and more specifically to an archery range practice device that simulates dynamic target situations. This invention is particularly well suited for simulating an animal hunt for an archer by providing a plurality of hunting scenes containing moving animals and sounds simulating the animals in their natural environment. This invention is especially useful as a training tool to enhance the shot placement and shot selection skills of an archer.

2. Description of Related Art

Various devices are provided in the art to enable target shooting practice, including the detection and indication of the spot within a target area through which a projectile has passed.

In U.S. Pat. Nos. 4,763,903 and 4,949,972, both by Goodwin et al, a printed paper target sheet is supported in front of an X-Y array of light beam generators and corresponding light beam detectors. When a projectile is fired at the target, the projectile breaks at least two light beams. The X-Y locations at which the light beams are broken enable a computer to score the projectile hit relative to the target. The computer can allocate scores to a particular individual, total the scores, and provide a CRT display thereof. The display can also show the target and its hit areas.

U.S. Pat. No. 5,020,806 by Martin teaches a dart game having two horizontally-spaced targets of conventional. configuration. Dart hits on the targets are detected. A shared computer scores the hits on the targets, and provides a display of the results.

U.S. Pat. No. 3,619,630 by McLeod et al describes an automated archery range having a quiver whose position defines a firing line. A fixed, penetrable target is spaced from the quiver and carries a painted or projected target that can be changed, as desired. A fired arrow penetrates the target, hits a backstop located behind the target, and is then automatically returned to the quiver. An image at the quiver simulates the target. An optical scanning system, including a rotating mirror, senses passage of the arrow, and an indicator light is controlled thereby to indicate the arrow hit position relative to the target.

U.S. Pat. No. 3,590,225 by Murphy is generally similar, and teaches a counter and a computer for determining the hit position of an arrow in the target area.

U.S. Pat. No. 4,678,194 by Bowyer et al describes a dart/archery target that signals the hit position by virtue of the dart/arrow acting as a transmitting antenna that radiates energy to a sensor.

U.S. Pat. No. 4,222,564 by Allen et al describes a target system having fixed and moving targets, and a control and score keeping system. A motion sensor detects vibration of a target when the target is hit.

U.S. Pat. No. 3,727,069 by Crittenden et al describes a target system wherein the position of a projectile hit is determined by the interruption of a plurality of light sources that are positioned along the X and Y axes of a target area.

U.S. Pat. No. 3,623,065 by Rockwood et al describes an archery range having a self-healing screen, and a projector for projecting a number of different but fixed target markings on the screen. Two mirrors and two scanning light sources are located in front of the screen. Interruption of the two scanning beams by an arrow enables detection of the arrow hit position on the screen. A monitor adjacent to the shooter replicates the target and shows the location of the arrow hit thereon. An automated arrow recovery system is likewise shown.

U.S. Pat. No. 3,807,858 by Finch describes a device for indicating the passing of a projectile through an area. In this device, the reflection of overlapping scanning light beams off of the projectile is detected. Signals are thus developed to enable a display to provide similar overlapping light beams whose intersection visibly indicates the point at which the projectile passed through the area.

U.S. Pat. No. 4,948,371 by Hall describes an interactive video system for use in training a security trainee. This patent is incorporated herein by reference for the purpose of illustrating the state of the art of interactive video training systems. However, this patent does not relate to an archery system, and does not freeze the hit frame and then display the frozen frame with the animal kill zones and the arrow hit indicators.

In the system of the Hall patent, a video disk is used to project a full size moving scenario onto a screen. The scenario is capable of branching to one of a number of sub scenarios, depending upon the results of the training session. The trainee is provided with an IR emitting laser gun. When the trainee shoots at an adversary that appears in a frame of the scenario, IR energy from the gun is reflected from the hit point on the screen to a full screen IR camera located adjacent to the scenario projector.

Hall employs a computer to analyze the output of the IR camera, and determines if the adversary was hit, and the placement of the hit on the person of the adversary. Placement of the hit is determined by means of hit zone information stored in the computer for this particular frame. This computer memory includes the placement of both kill and disable zones within the person of the adversary. In accordance with the detected placement of the hit, the scenario branches to various sub scenarios, including the ability of the adversary to shoot back by way of energization of an IR emitting LED that faces the trainee. It is assumed that the adversary is always a perfect shot, and unless the trainee has sought cover, as is sensed by actuation of a treadle switch, an IR sensor on the vest worn by the trainee indicates a hit by the adversary.

U. S. Pat. No. 4,657,511 by Allard et al discloses a rifle shooting range wherein an IR laser beam is directed to a screen upon actuation of a trigger mechanism. Pulling the rifle trigger sends a signal to a computer that operates to activate the IR source at the rifle, and to stop a projector that is projecting a picture on the screen. The arrested image and the laser beam hit spot are reflected from the screen to a video camera. The video camera and the computer operate to cause the arrested image and a symbol, such as a cross, indicating the beam hit location to be displayed on a TV screen.

U.S. Pat. No. 5,194,006 by Zaenglein discloses a weapon shooting simulator in which a trigger actuated laser beam is directed toward a screen on which a moving target is projected. The position of the target and the beam hit on the screen are displayed on a TV receiver, or are projected onto the screen.

While the prior art is generally useful for its intended purpose, the need remains in the art for a system and process suitable for training an archer in a controlled environment, but with simulation of the natural environment an archer might encounter, as in game hunting. Furthermore, the contemporary training of an archer for hunting is predominantly on static targets and actual field experience. Unfortunately, the latter results in frequent debilitating but non-critical injury of the game animals. Thus, a need remains for a controlled and safe environment in which to realistically train archers for hunting so as to improve the quality of their abilities as game hunters and most notably the quality of their skills in shot placement and shot selection.

SUMMARY OF THE INVENTION

The present invention is an archery practice device and process that simulates dynamic target situations, such as an animal hunt, by providing a video or CD-ROM disk having stored thereon a plurality of hunting scenes containing moving animals and audio simulating a natural environment. These scenes are projected on a screen of a size appropriate to simulate an area normally viewed by an archer during an animal hunt.

In one embodiment of the invention, an unbroken field of light of a spectrum that is invisible to an archer is provided adjacent to the screen. As an arrow penetrates the light field, light is reflected from the arrow to a detector sensitive only to light of this invisible spectrum and capable of monitoring the entire screen.

In another embodiment of the invention, the screen includes an impact sensor and an arrow impact on the screen triggers a short duration pulse or flash of illumination of the invisible spectrum, so that light is then reflected from the arrow to the detector.

The hit frame is frozen on the screen in response to the signal from the light detector. The point of arrow impact is indicated relative to the frozen frame. Kill zones are projected on the frozen frame to visually present an indication of the arrow hit relative to the kill zones for the displayed scene and/or animal.

An arrow shooting range is provided in the shape of a closed-end tunnel having a rectangular or square cross section. The closed end of the tunnel contains a vertical screen on which a moving image is projected by way of a floor mounted video projector.

The arrows used for shooting at the image have a blunt leading end, and carry an IR reflector on or near the leading edge thereof, for example a number of corner cube reflectors. The arrow reflects an IR pulse to a full frame IR camera that is positioned to receive the IR light. The output of this detector comprises a full screen image having a dark image output only in an area that is coincident with the reflection from the arrow.

The arrows do not penetrate the screen, and since the screen is mounted under tension by the use of springs, and is backed by a pad, substantially all of the arrow's impact energy is absorbed by the screen and the pad. Thus, the arrow gravity drops, or falls between the archer and the front surface of the screen.

In order to eliminate the shadow of an arrow in the IR camera view as the arrow drops vertically down to the floor after impact with the screen, a software-controlled computer system is constructed to respond to only the first IR reflection.

The portion of the tunnel between the screen and the projector preferably comprises an opaque wall covering. The shooting area comprises the length of the tunnel from the projector to the open end of the tunnel. The tunnel walls in this shooting area allow a diffused light to enter the tunnel. Preferably, the outside surface of the tunnel is covered with archery netting to prevent penetration by arrows that are shot outside of, but adjacent to, the tunnel.

This invention advantageously employs conventional interactive video disk system principles. An analog video/audio or digital CD-ROM disk provides full screen moving images, such as of one or more game animals in their natural hunting environment. The audio makes it possible to enhance the visual images with the sounds of the animals as one would expect to hear in nature. The scenes include circumstances, such as a deer walking through the woods, wherein in some frames of the image, the hunter is not presented with a view of the animal presented as an appropriate shot opportunity.

For example, a scenario or sequence of scenarios are randomly selected from the disk, each sequence comprising a few seconds of a hunting scene. If an arrow is dispatched during a sequence, IR reflection from an arrow operates to signal the computer to freeze that frame of video; for example, for 10 seconds. An IR detecting camera sends its full-screen signal to the computer. The computer correlates this detected IR reflection with the frozen hunting frame. As a result, the point of arrow impact is displayed.

In addition, each frame that has or may have an animal kill zone is provided with an overlay that shows the location of the kill zones on the frozen frame. The correspondence between a variable position arrow hit spot and the fixed position kill zones provides both a manual and a computer means for scoring the arrow hit. For example, if no arrow is dispatched during a scene, a zero is scored and, if an arrow is dispatched when there is no shot opportunity, a negative number is scored.

Typically, the computer is set up so that the sensing of an arrow results in ending the particular frame sequence at whatever frame the arrow hit was detected, and the program resumes, after a short delay, beginning with the next randomly-selected sequence of frames, although it is possible to resume the interrupted sequence.

Text is displayable on the screen, for example, to identify the name of the next shooter, and to alert the shooter that a program of hunting scenes is about to begin.

For each possible sequence of frames, such as one of a series of hunting scenarios resident on one disk, the start and stop frame numbers are stored in memory, and are accessed randomly and played start to finish when an arrow is not sensed during the scenario. A disk might contain fifty-five such scenarios, by way of example.

Management software that is transparent to the shooter enables a central computer to access each site computer in order to obtain data for the purposes of billing and general record keeping.

Different sites may compete with each other off line. In this arrangement, the central computer accesses the computers at the competing sites, compares the results of the two teams, and reports the results back to the sites.

An object of the invention is to provide a dynamic target simulation system for archery practice and particularly to provide a moving image of an animal on a screen, wherein an arrow hit on the screen is detected on its way to the screen or, as a result of the arrow hitting the screen such that a frozen frame of the animal is then shown having animal kill zones overlaid thereon, such that the shooter may compare an arrow hit location to the kill zones in order to determine a score.

As a further feature of the invention, the arrow does not penetrate the screen, and the system is disabled so as to not respond to secondary reflections that may occur during a vertical drop of the arrow to the floor at a position between the archer and the screen.

As another feature of the invention, audio signals are provided for the hunting scenes to simulate the natural environment of the hunting scene.

As yet another feature of the invention, the frozen visual image includes animal kill zones corresponding to the critical areas of one or more animals therein that are exposed to impact by an arrow, and these kill zones are shown or displayed along with the frozen hunting scene so as to indicate the relationship between the kill zone and the point of arrow impact.

A further object of the invention is to provide a method and apparatus for simulating an archery animal hunt by way of a disk that contains a plurality of hunting scenes containing animals, which scenes are projected onto a vertical screen whose size simulates an area normally viewed during an animal hunt, the screen comprising a array of pixel areas arranged in horizontal rows and vertical columns.

A continuous full-screen field of light of a spectrum that is not visible to an archer (for example, infrared or IR) is located in proximity to the screen, or a pulsed field of light is directed toward the screen, and an arrow that is capable of reflecting light of the aforesaid spectrum provides a reflection to a full-screen detector that is sensitive only to light of the invisible spectrum. Upon detection of an arrow as it approaches the screen, or upon detection of an arrow at an arrow hit position on the screen, the hunting scene is frozen on the screen with an arrow hit graphic overlaid onto the image, to thereby indicate a point of impact of the arrow.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 1 is a perspective view of an archery range in accordance with a first embodiment of the present invention.

FIG. 2 is a partial side view of the elements associated with the screen at the closed end of the FIG. 1 tunnel.

FIG. 3 is the side view of the leading end portion of an arrow of the type used in the practice of the first embodiment of the invention.

FIG. 5 shows an exemplary overlay added, as by a computer system, to the animal image so as to depict typical areas of animal kill or disabling in coordination with an arrow hit presentation on the display of a Cathode Ray Tube (CRT).

FIG. 7 is a side view of an adapter to provide the reflective tip removably attachable to the end of an arrow shaft.

DETAILED DESCRIPTION OF THE PREFERRED EMBODIMENT

FIG. 1 is a perspective view of an arrow shooting range constructed in accordance with a first embodiment of the present invention. The components of the range are shown in FIG. 1 in their general overall operating relationship, although somewhat out of proportion. This range is in the shape of a tunnel 10 having a target, or closed end 11, and an entry or open end 12. It has a generally rectangular cross section, typically about ten feet high, twelve feet wide, and about sixty feet long.

Figure 8:
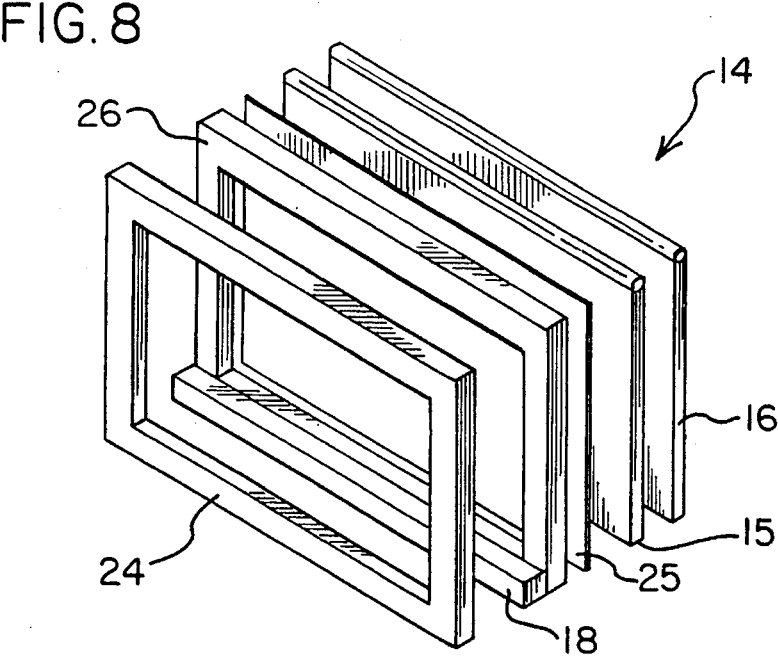
FIG. 8 is a partially exploded perspective view showing the general relationship of the elements associated with the video screen of FIGS. 1 and 2.

At the closed end 11 of tunnel 10 is a three-layer vertical screen 14. A portion of screen 14 is shown in a side, broken view in FIG. 2, and a partially exploded perspective view is shown in FIG. 8. A moving hunting image is projected onto the front of screen 14 by way of a floor mounted video or CD-ROM projector 13 of conventional construction, for example, of a liquid crystal type.

With reference to FIGS. 2 and 8, screen 14 comprises a vertical screen 25 of an open mesh and overlaying a sheet of white felt fabric 15 suitable to reflect the projected image. Sheet 15 and mesh screen 25 cooperate for presenting a clear visual image to the shooter from a distance. Fabric 15 is, in turn, backed by a vertical pad, or sheet of carpeting 16, that is spaced a short distance therefrom. Carpet 16 provides the desired final arrow stopping or arresting characteristics. The flight of an arrow 17, nearing the end of its trajectory towards screen assembly 14, is likewise represented in FIG. 2. While not critical to the invention, an embodiment of screen 14 was a rectangle measuring about eight feet high and ten feet wide.

The closed end 11 of tunnel 10 includes a floor-mounted housing 18 that contains one or more sources of infrared (IR) radiation that are directed upward from the flat, planar, floor 19 of tunnel 10. For example, IR source 18 may comprise a row of light emitting diodes or LEDs. As a result of the operation of IR source 18 within tunnel 10, a continuous vertical plane 20 (see FIG. 2) of IR radiation or light (i.e., radiation that is invisible to a human) is located a short distance ahead of screens 15, 16 and 25; for example, about 0.5 inches ahead of fabric Haverol screen 25.

FIG. 8 illustrates, in a slightly exploded view, the interrelationships of the elements of screen 14 with regard to the IR source 18 and associated light shields. An outer frame 24 forms a barrier to prevent stray IR light rays from around the perimeter of screen 14 from causing false or disrupting signals at IR detector 21. It might take the form of a black frame, eight inches by one inch in cross-section, eleven feet wide and slightly less than nine feet in height. A similar bezel or frame 26 is positioned immediately in front of mesh screen 25, with IR source box 18 secured at its base. Frames 24 and 26 are held in position relative to one another by spacers (not shown) thereby forming a box intended to control the IR light emitted from source 18 so that a wall of IR light is emitted at the base of screen 14.

Polyester mesh screen 25 is preferably held in place under tension by spring attachments (not shown) around its entire perimeter somewhat like a trampoline. Felt 15 and carpet 16 are allowed to hang downwardly from horizontal rods at their tops, so that they are free to pivot. The mesh of screen 25 is tight enough so that an arrowhead, similar to FIGS. 3 and 7, will not pass through it. The tension on screen 25 allows it to flex towards hanging felt 15 and carpet 16 which absorb most of the energy of the impact of arrow 17. The tension on screen 25 is adequate to return the arrow to the area in front of the screen 14. The screen 25 tension likewise prevents dimpling or bending the screen 14 elements.

It is possible to obtain the function of frame 24 by a valence or other structure. Frame 24 helps contain the IR light from source 18 and frames the visible area for screen 14 with respect to the detector camera 21. Preferably, the wall of IR light from source 18 is as close as the flatness of the face of screen 14 will allow.

Figure 9:
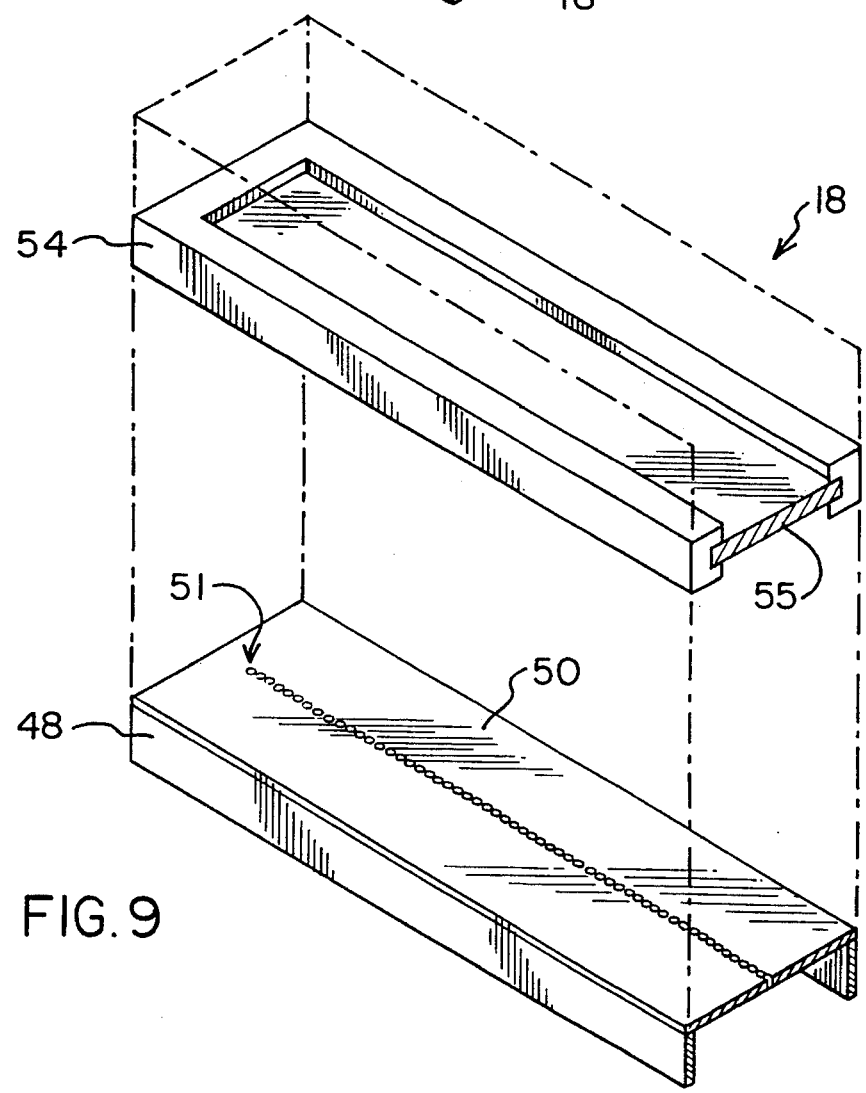
FIG. 9 is a partially sectioned view of the first embodiment of the invention showing the components in the box which produces a wall of light for reflection from an arrow upon an arrow penetrating the wall of light.

A portion of IR light source 18 is shown in a perspective and sectioned view in FIG. 9. A housing 48, which is shown solid at the bottom, also encloses the ends and sides, as indicated by the dotted lines. Housing 48 is open at the top. A circuit board 50 is retained in the lower region of housing 48, and has an array of LEDs oriented to direct IR light upwardly. In one version of source 18, the LEDs were slightly less than 0.5 inches in diameter and were mounted on half inch centers. Thus, for a ten foot length, about two hundred forty LEDs were used.

Housing 48 has a bracket 54 secured thereto in the upper portion thereof. Bracket 54 holds one or more lens elements 55 in place, which intercept the light from LEDs 51 and collimate it into an upwardly-directed wall. Such lenses are conventional, and redirect rays of light from a point source so that they all are commonly directed into parallel relationship and in the same direction.

For example, off-the-shelf, commercially-available collimating lenses, approximately three inches wide by four inches long and one-fourth inch thick, were placed in abutting relation within bracket 54 to form the ten-foot long wall of IR light. Although not shown in FIG. 9, housing 48 also contains a power source and voltage regulator along with an on/off switch. One satisfactory implementation of the device was formed with housing 48 eight inches high by four and one-half inches wide by one hundred twenty six inches long.

A horizontally-traveling arrow, such as 17, depicted in FIG. 2, carries an IR reflector on the blunt leading end or edge thereof. As arrow 17 penetrates IR light wall 20, an IR pulse is reflected back to a full screen IR camera or detector 21 that is located for monitoring the complete front face of screen 14. In the example shown, detector 21 is positioned next to, or directly beneath, the projector 13, about nineteen feet from screen 14. The output of detector 21 is coupled to computer 33, and comprises signals corresponding to a full-screen image present on screen 25, this image having a no-signal output surrounding the relatively small area that comprises the reflection signal from arrow 17 as the arrow passes through IR field 20.

By way of example, projector 13 comprised the brand Sharp XG2000 LCD projector, and provided a full screen image of 8×10 foot screen 14, comprising an X-Y (horizontal-vertical) coordinate signal containing 512 by 480 pixels. A VGA-type display might employ an image definition of 640 by 512 pixels.

As is explained below, after it is detected that arrow 17 penetrated light wall 20 and has thereafter impacted screens 15 and 25 and carpet layer 16, the computer system of the invention, along with its controlling programs, are constructed and arranged to respond to only the first IR reflection from arrow 17. Thus, secondary IR reflections from a falling arrow are ignored.

The portion 30 of tunnel 10, between closed end 11 and screen 15 and projector 13, preferably comprises an opaque wall covering. The tunnel shooting area 31 generally comprises the length of tunnel 10 that extends from projector 13 to the tunnel open end 19. The tunnel walls in shooting area 31 are preferably constructed and arranged to allow a diffused light to enter tunnel 10 in this portion thereof.

Usually, tunnel 10 is located in an archery shooting area wherein conventional arrows are shot at stationary targets. As a result, the outside of tunnel 10 is preferably covered with (or defined by) archery netting (not shown), to thereby prevent penetration by arrows that are shot outside of, but adjacent to, tunnel 10.

FIG. 3 is the side view of the leading end portion 22 of an arrow 17 of a type found convenient for use in the practice of the invention. Arrow 17 has a blunt leading end 22 and a radiation or IR reflector 23, which can take the form of a chrome plated collar in proximity to the leading edge of arrow 17.

A typical tip 22, suitable for attachment to the end of the shank of an arrow, is presented in FIG. 7. The outer end has a shank extension 27 terminating in a threaded portion 28 which mates with internal threads of a bore into the end of arrow 17. This allows replacement of a more conventional arrowhead with the target system head 22. While a variety of different sized heads 22 have proven satisfactory, a typical size for head 22 is to employ a radius 29 of 9/32 inches with a depth of 0.220 inches from front face to a 0.340 inch diameter face at the shank end of the bowl of reflector 23, a shank 27 with 0.365 inch length and 0.2035 inch diameter, and a threaded end 28 of 0.344 inches in length and a thread of 8–32 UNC class 2A.

Note that at least two modes of delivery of scenarios are possible. In the competitive mode, the system randomly selects scenarios and plays them in sets of six for up to four archers. In this mode, the computer scores each archer, and links that score to a data file. One competitive round might consist of thirty shots for each archer divided into five sets. Scores are totaled and displayed on the screen after each set, and a cumulative score is displayed at the end of the round.

The second mode is the random mode. This mode is simply a random selection of scenarios for presentation, and does not have a function to keep track of who is shooting. The scoring is manual. Each scenario will, when shot at, display the usual hit mark and vital zones, as well as the point score on the screen. This mode is useful in commercial archery ranges using systems in accordance with this invention, wherein the archer rents the range for a predetermined period of time during which the archer can take as many shots as desired.

The archery range simulator of the present invention comprises a computer-controlled system for emulating real life bow hunting, and/or league competition among teams of archers or bow hunters. While not critical to the invention, it is contemplated that a central computer will serve a number of individual sites where individual simulators of the invention are installed. This central computer will provide features, such as a master data base, that facilitates management of the sites, the distribution of information to and among the sites, and the recording and reporting of league competition results to the various sites.

At each of the sites, and under local computer control, real life scenarios are projected on an 8×10 foot screen, thus involving the archer in the reality of a real life bow hunting experience. While not critical to the invention, a plurality of multiple frame video scenarios are provided; for example, fifty-eight different scenarios per disc side. For each individual shooter, six of these scenarios are selected by the site computer at random.

In an embodiment of the invention, the system allowed from one to four shooters to shoot in sequence, each shooter being presented with a set of five multiframe scenarios, each scenario typically running about 0.2 minutes. Each shooter will shoot six arrows in each set, for a total of thirty arrows for a complete round. To facilitate scoring by the site computer, the name of the shooter is displayed on the screen for a short time prior to the beginning of the sequence of scenarios for that shooter.

After all shooters have viewed and shot their computer-generated scenarios, a brief interval is allowed for the shooters to approach the screen and retrieve the arrows. Of course, the facility could include an automatic arrow retrieval system with a conveyor to return the arrows to the shooters, if desired. During the arrow recovery time, the computer can display public service announcements, instructions, entertainment, and/or advertisements on the screen 14.

Figure 4:
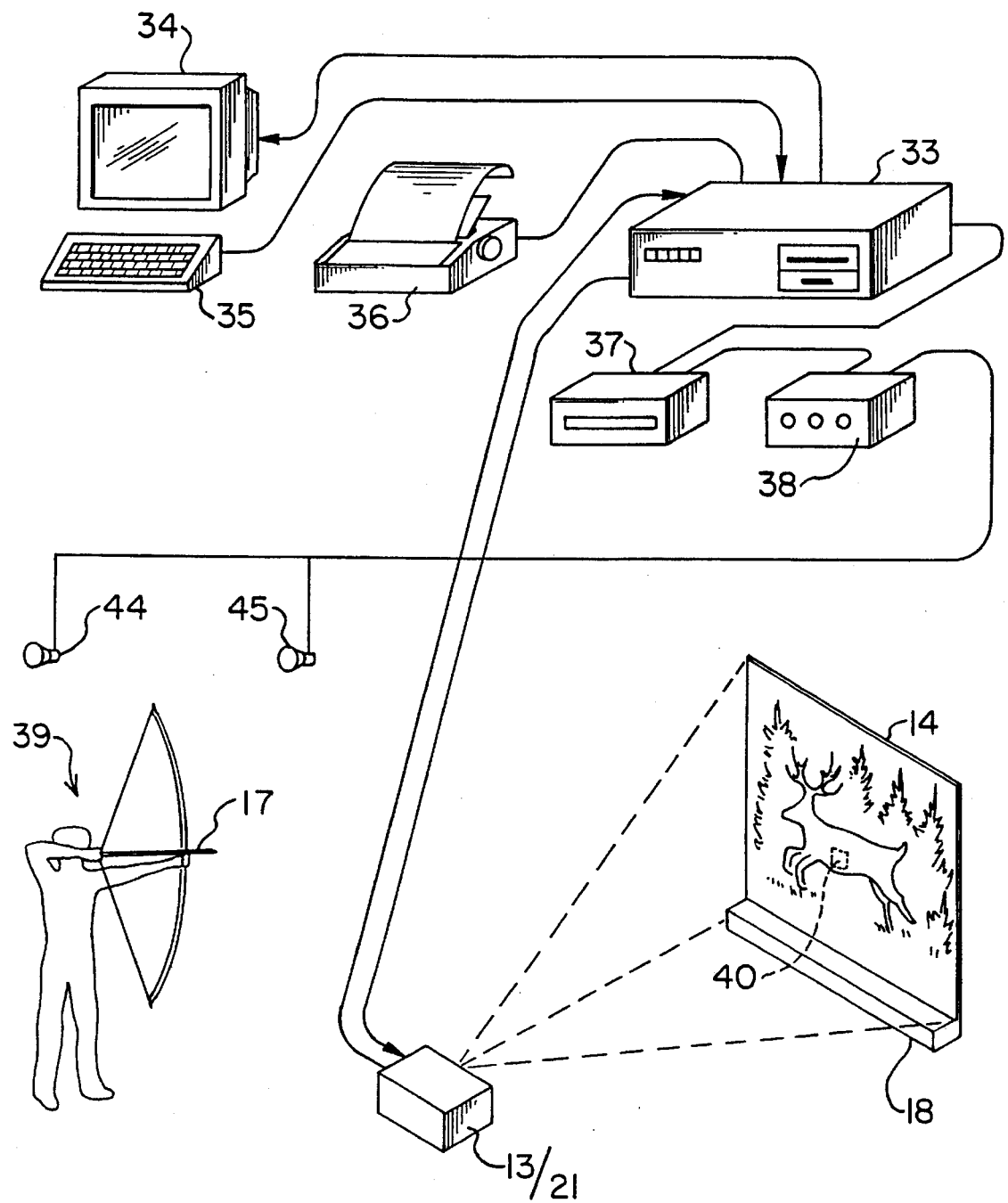
FIG. 4 is a diagrammatic showing of a shooting site incorporating the invention.

FIG. 4 is a diagrammatic showing of a shooting site incorporating the invention. The site computer comprises a Central Processing Unit (CPU) box 33 having an analog video/audio disk player 37, a CRT display 34, a keyboard 35 and a printer 36, all of conventional and well-known design. The video output of disk player 37 is provided to computer 33 which introduces it to projector 13. The audio portion is coupled from disk player 37 to the audio controller 38 and thence to speakers 44 and 45. As a result, a dynamic hunting scene is projected onto screen 14 at about thirty frames per second with appropriate sound accompaniment.

An archer 39 views this scene on screen 14, and determines the proper time at which to shoot an arrow 17 at the dynamically presented target displayed thereon, such as an animal or animals. As was mentioned above, the scene might include multiple frame portions during which archer 39 is not provided with a clear shot at a kill zone of the animal. Should the archer choose to shoot during such a frame portion, the CPU scoring system might actually penalize the archer by scoring negative points. This is accomplished by the computer storing information identifying the frames during which the archer does not have a clear shot at the target.

In accordance with a first embodiment of the invention, when arrow 17 is shot, the arrow penetrates the IR field that is generated by IR source 18 immediately in front of screen 14. As a result, an IR pulse is reflected back to an IR detector at the same station as camera 21. In accordance with a second embodiment of the invention, when an arrow is shot, the impact of the arrow on the screen is detected, and an IR source is momentarily triggered to illuminate the screen and the arrow. As a result, an IR pulse is reflected back to the IR detector.

Camera 21 detector now sends a full-frame signal to CPU 33, whereupon the shot-at frame is frozen on screen 14. While not present until the presence of an arrow 17 is detected adjacent to or at screen 14, the actual hit location, as well as the animal kill zones (such as kill zone 40 shown in FIG. 4), are thereafter presented by computer 33 concurrently with, and as part of, the frozen frame. The kill zone organization is shown and described in greater detail in FIG. 5.

The hit frame is frozen for a predetermined period of time, such as a period of about ten seconds, for example. Thereafter, the hit scenario is aborted, and the next scenario begins. The actual point of arrow impact in the FIG. 5 illustration is presented as a solid circle 41, which is exaggerated as compared to the actual arrow diameter for visibility at a distance. The center of circle 41 depicts the actual arrow impact point. Of course, the computer 33 could present a bright outer circle and a central dot large enough for the archer to see from the shooting line.

The output of IR detector camera 21 usually comprises a multiple pixel area constituting the IR reflection from the arrow. CPU 33 also operates to identify and display this arrow hit area displayed on screen 14, for example, as shown at 41 in FIG. 5.

Thus, FIG. 5 shows the display of an example of a primary kill zone 42, and a secondary kill zone 40 surrounding the outer edge of zone 42, thereby coordinating display of a three-zone arrow hit indicator. This zone pattern is visible on the target animal of the screen along the lines of zone 40 shown in FIG. 4. In the FIG. 5 example, the shooter 39 receives a score of "5", since the center of arrow indicator 41 is within the outer zone 40.

While the position of kill zone 40 is fixed with respect to the hit frame, the position of arrow hit zone 41 relative to zone 40 varies in accordance with the accuracy of shooter 39. The arrow hit zone 41 is really just a spot and not a zone. The spot 41 is made larger than the actual tip of the blunt arrow only to facilitate visibility to the archer. The sensor, together with the computer, determines the exact point of impact and scores the hit in accordance with the actual impact point.

Figure 6A:
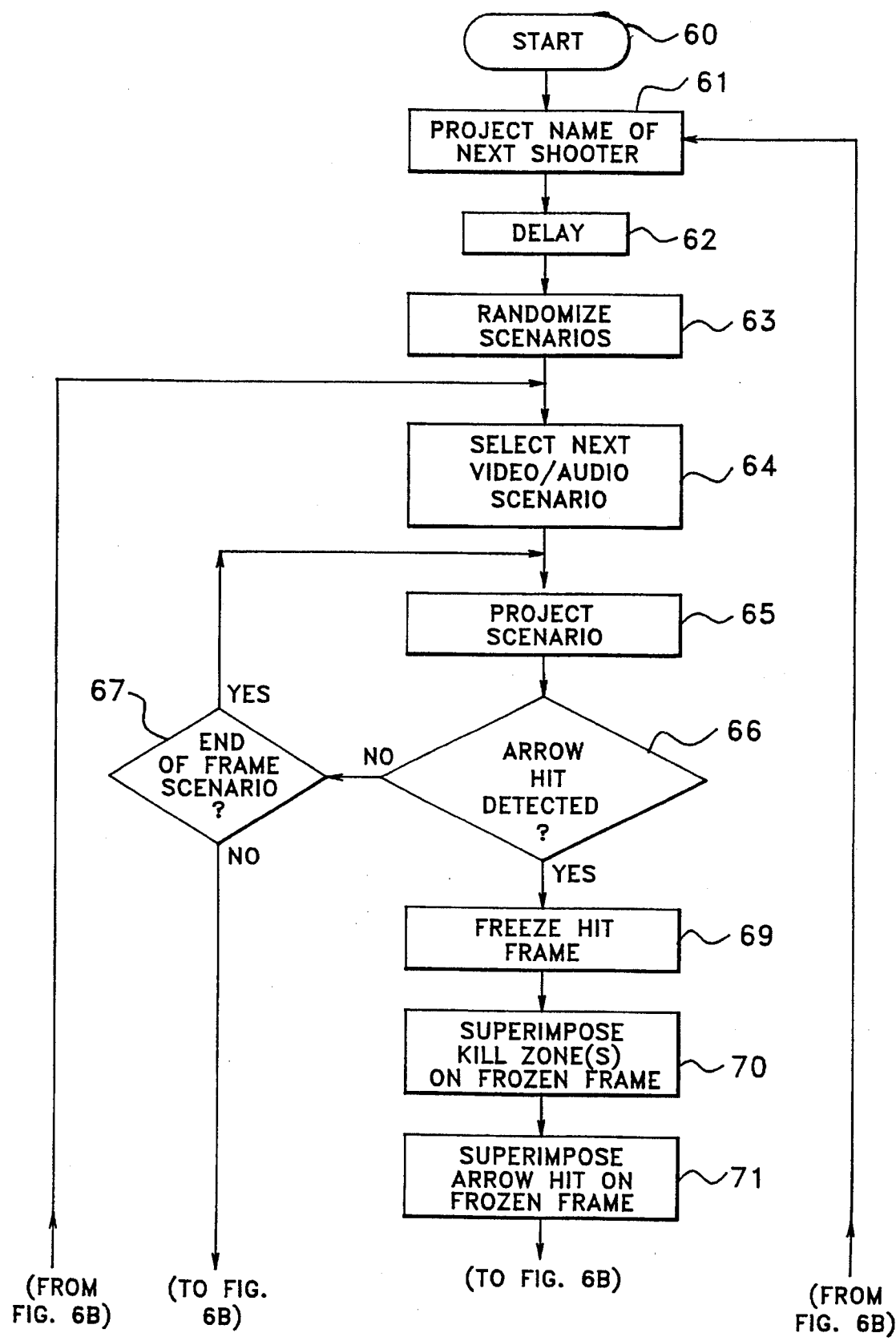
FIG. 6 is comprised of FIG. 6A and FIG. 6B to present a flowchart that shows a mode of operation of the invention.
Figure 6B:
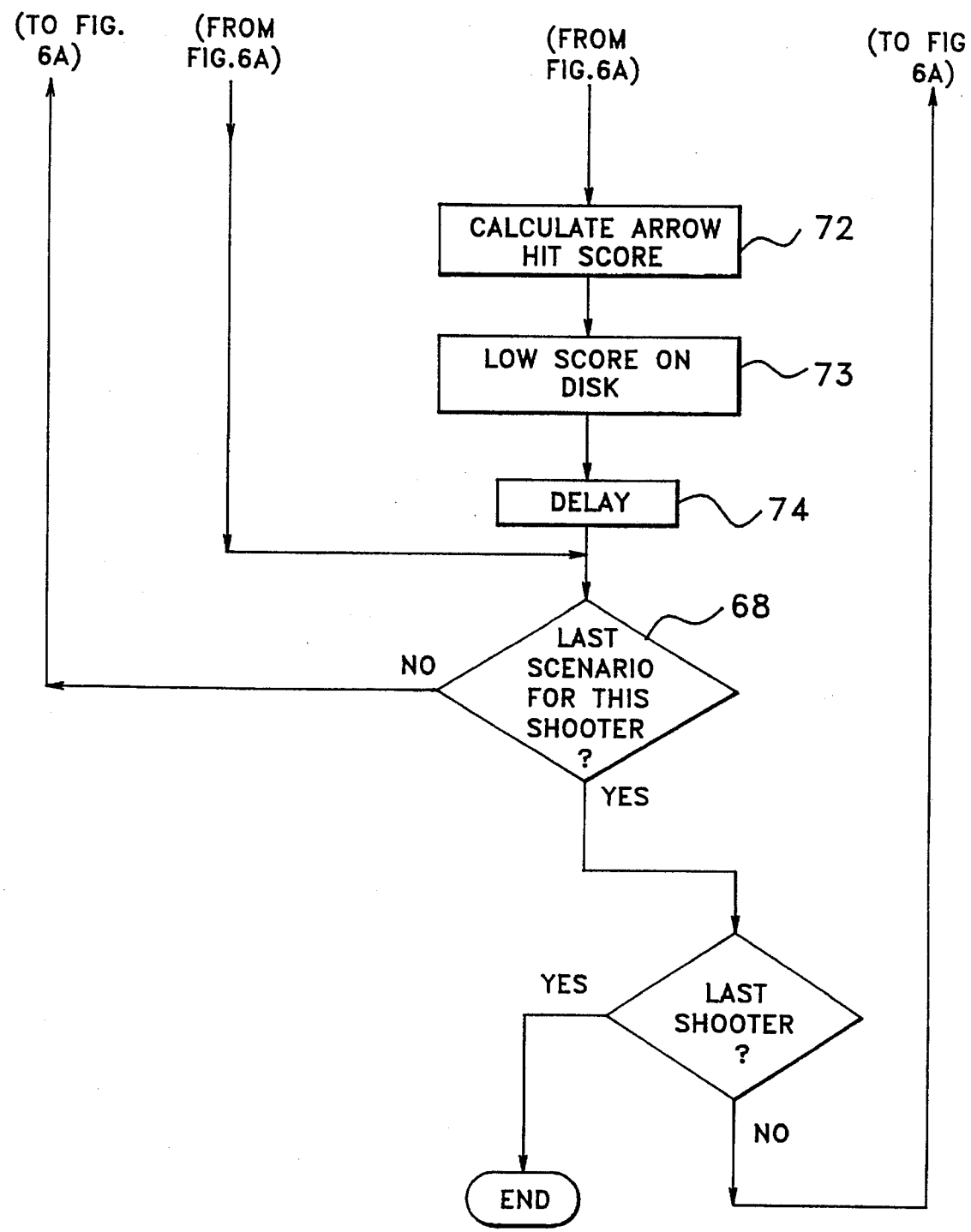

FIG. 6 is a flowchart that shows a mode of operation of the invention. Operation of the invention begins at start event 60. As a result of a start event, the name of the first (or next) shooter is projected on screen 14 by operation of projector 13. Of course, prior to this time, the names of the various shooters and possibly other relevant information were entered into memory that is associated with CPU 33 by way of manual operation of keyboard 35.

Initially for a match event, box 61 causes projection of the name of the first shooter onto screen 14, whereupon delay box 62 provides a period of time such as five seconds for this shooter to become ready in shooting area 31. After, or perhaps concurrent with, this delay interval, box 63 operates to randomize the selection of a given number of scenarios from disk player 37 for this shooter, whereupon box 64 operates to select the first of these preselected scenarios for projection on screen 14.

Box 65 indicates the beginning of projection of a selected scenario from the first to the last frame thereof. During this projection, decision box 66 monitors for an arrow hit, as detected by IR camera 21. As long as no arrow hit is detected, and as long as the last frame of the current projected scenario is not detected by box 67, box 65 operates to continue projection of the current scenario.

When an end frame of the current projected scenario is detected by box 67 without detection of an arrow hit by box 66, and when box 68 detects that this shooter has more scenarios to view for shooting, then box 64 operates to select the next scenario for projection for this shooter.

When an arrow hit is detected by box 66, box 69 operates to freeze the hit frame on screen 14 for viewing. The frame that is available for viewing now has the animal kill zone(s), if any, superimposed thereon by operation of box 70, and the location of the arrow hit is also superimposed thereon by operation of box 71, as shown in FIG. 5. This arrow hit results in CPU calculation of the resulting score by box 72, whereupon box 73 operates to log the score for the current shooter in memory, such as on a magnetic recording disk by operation of CPU 33.

Box 74 provides a delay interval of about four seconds during which the hit frame is projected for view, along with the location of the arrow hit and the animal kill zones. At the end of delay 74, box 68 determines if the last scenario has been projected for this shooter. If not, then box 64 operates to begin the projection of the next scenario.

If box 68 determines that this shooter was presented with the last scenario for that shooter, then box 75 determines if the current shooter is the last shooter, If yes, the process ends. If no, box 61 operates to project the name of the next shooter on screen 14, whereupon the process repeats for the next shooter, as above described.

The system described hereinabove automatically freezes the frame each time the arrival of an arrow at the vertical imaging plane of the screen 14 is detected. However, it is possible to modify the system so that the user can select other image display disciplines. One selection could cause the frame sequences to continue to the end of the scenario no matter how many arrow impacts are detected but with the location and frame numbers of the hits stored in memory for later presentation. Alternatively, the frames might continue until a preselected number of arrow impacts are detected. Thereafter, the system could sequence through so as to display each frame of that scenario wherein an arrow impact was sensed while depicting the result of each hit along with the score obtained.

Figure 10:
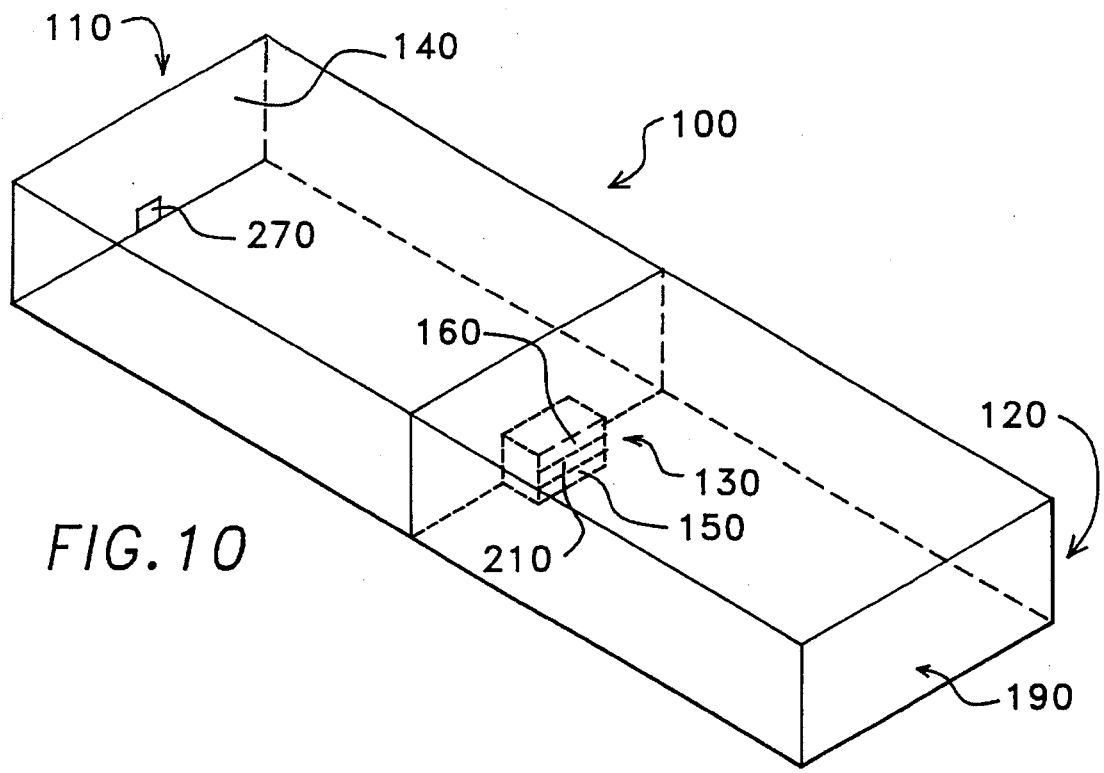
FIG. 10 is a perspective view of an archery range in accordance with a second embodiment of the invention.

FIG. 10 is a perspective view of an arrow shooting range constructed in accordance with a second embodiment of the invention. The components of the range are shown in FIG. 10 in their general overall operating relationship, and somewhat out of proportion. This arrow shooting range is in the shape of an elongated chamber or tunnel 100 having a target, or closed end 110, and an entry or open end 120. Tunnel 100 preferably has a generally rectangular cross section typically about ten feet high by 12 feet wide, and is about 60 feet long. A screen 140 is located at the closed end 110 of tunnel 100 for viewing by an archer who is standing at open end 120 of tunnel 100. While not critical to the invention, an embodiment of screen 140 was a rectangle measuring about eight feet high and ten feet wide.

Figure 11:
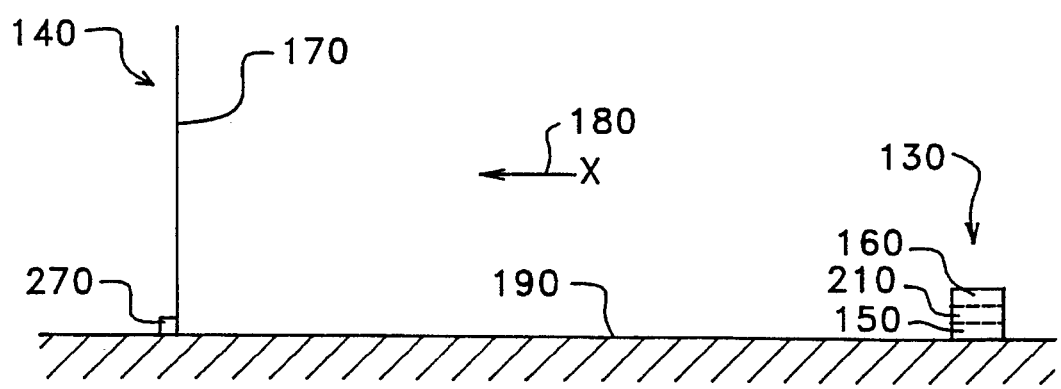
FIG. 11 is a side view of portions of FIG. 10.

FIG. 11 is a side view of portions of FIG. 10. A moving full screen hunting image is projected onto the tunnel side 170 of screen 140 by way of a floor-mounted video or CD-ROM projector 150 of conventional construction that is contained in a housing 130 of noncritical construction. Video projector 150 may comprise a contemporary structure such as the brand Sharp XG2000 LCD device.

Floor-mounted housing 130 also contains an intermittent source of infrared (IR) radiation 160 in accordance with this second embodiment of the invention, as is described later herein. Radiation from source 160 is directed somewhat upward from the flat, planar, floor 190 of tunnel 100. As a result of the operation of IR source 160, a generally vertical and momentary plane of IR radiation (i.e., electromagnetic radiation that is invisible to a human) is provided at screen 140.

A full-screen IR detector 210 is located immediately under IR source 160. Detector 210 comprises a full-screen IR video camera, CCD TV camera, or detector, of conventional construction that is located for scan monitoring the complete front face 170 of screen 140.

As will be apparent, a horizontally-traveling arrow carries a backward facing corner cube reflector on the leading end thereof. In FIG. 11, the direction of flight of such an arrow toward screen 140 is represented by the arrow numbered 180. As the arrow arrives at screen 140, IR source 160 within housing 130 is energized or strobed, screen 140 is momentarily flooded with IR radiation, and the arrow is detected at its arrival location via an IR pulse that is reflected back to detector 210 from the arrow reflector 260. While not critical to the invention, in an embodiment of the invention, IR source 160 produced an output having a time duration in the range of from about 0.05 to about 0.10 seconds. In the example shown, detector 210, IR source 160, and video projector 150 are horizontally positioned about 19 feet from screen 140.

The output of detector 210 comprises a signal, or signals, corresponding to a full-screen IR image of screen 140. This image has, for example, a no-signal output surrounding the relatively small area that comprises the reflection signal from the arrow as the arrow is illuminated in its screen impact position by the strobing type energization of IR source 160.

As will be apparent, an arrow impact detector 270 is located generally at the bottom center of screen 140. Detector 270 operates to detect the impact arrival of an arrow anywhere on the front surface 170 of screen 140. In an embodiment of the invention, impact detector 270 comprised a piezoelectric device.

Figure 12:
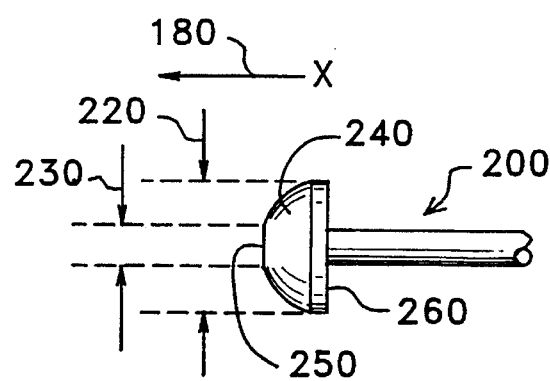
FIG. 12 is a side view of the leading reflective end of an arrow for use in the FIG. 10 embodiment of the invention.

While the details of construction and arrangement of an arrow in accordance with the invention are not critical to the invention, FIG. 12 shows a side view of the relatively blunt leading end of an arrow 200 that was used in this second embodiment of the invention. The generally horizontal direction of flight of arrow 200 toward screen 140 in FIG. 12 is shown at 180. The leading end of arrow 200; i.e., the end that impacts screen 140 comprises a section 240 of a sphere having a diameter 220 of about ⅝ inches.

This leading arrow portion 240 includes a centrally-located circular flat surface 250 having a diameter 230 of about ¼th inch. The base of sphere section 240 carries a flat reflective corner cube disc reflector 260 that operates to reflect IR radiation from source 160 back toward IR detector 210, as will be described. In an embodiment of the invention, the material from which reflective reflector disk 260 was formed was a product of the 3M Company known as 3M Scotchlite, 980-10ES, Conspicuity Sheeting, Diamond Grade. As stated, reflector 260 is of the well-known corner cube type. That is, when incoming light strikes reflector 260 this light is reflected back to the light source in a path that is parallel to the incoming light path. This parallel reflection property of reflector 260 is independent of the positional orientation of reflector 260 relative to the position of the source of the incoming light. In general terms, reflector 260 is made up of many small, individual, corner cube reflectors which, when viewed from the perspective of light source 160, appears as a mirror that reflects most of the light originating from source 160 back to this source and thus to detector 210. Light from other sources that may illuminate screen 140 and reflector 260 will, on the other hand, produce only a weak intensity diffused reflection from reflector 260.

As with the first embodiment of the invention, arrow 200 does not penetrate screen 140, and after impact and illumination by source 160, arrow 200 falls in front of screen 140, at a position that is between the screen and the archer.

Figure 13:
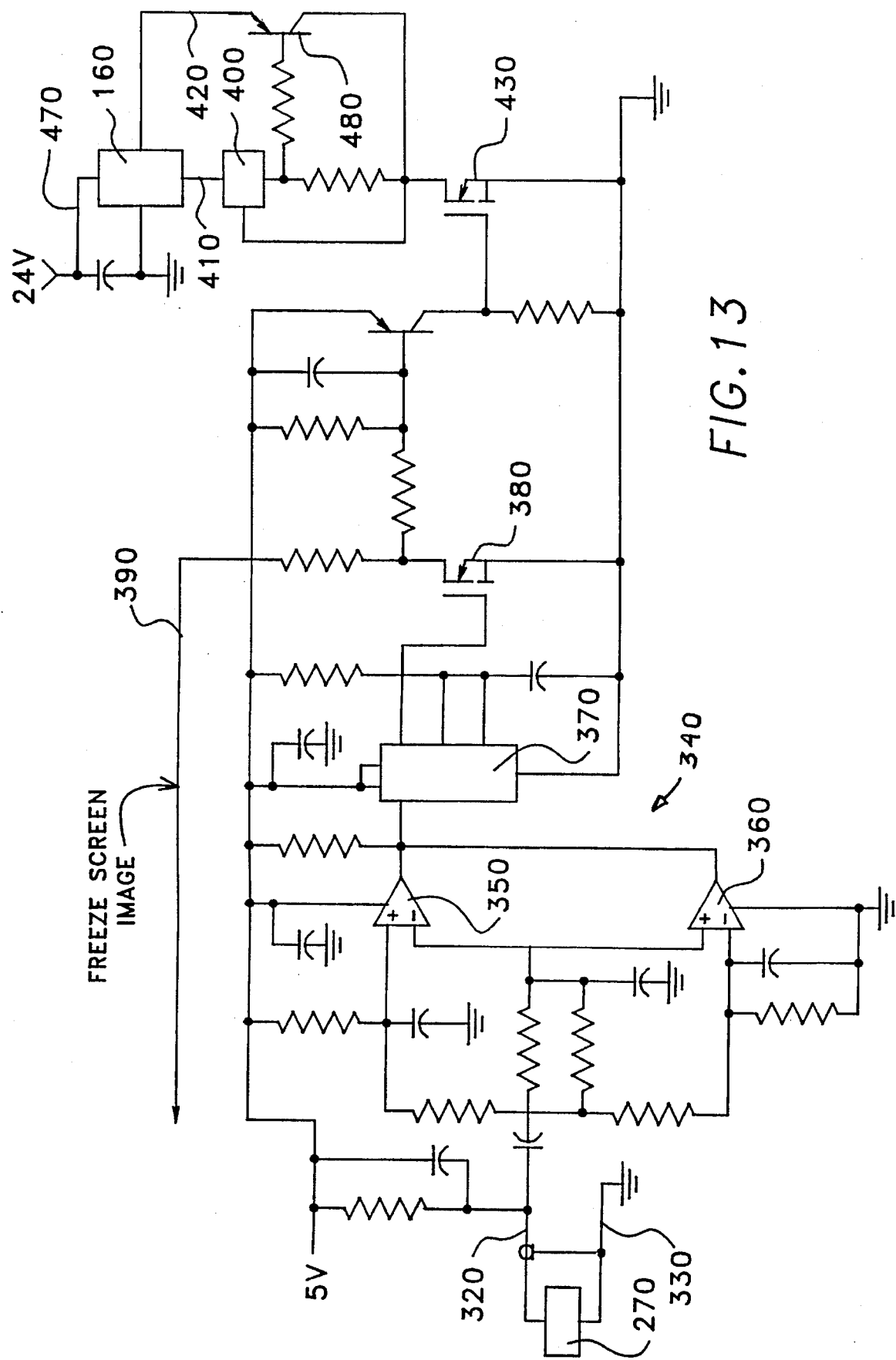
FIG. 13 is a schematic showing of the screen impact detector of FIGS. 10 and 11, and the electronic means that responds to the arrival of an arrow at the screen of FIGS. 10 and 11, to thereupon freeze the impacted screen image, and momentarily energize the IR source of FIGS. 10 and 11.
Figure 14:
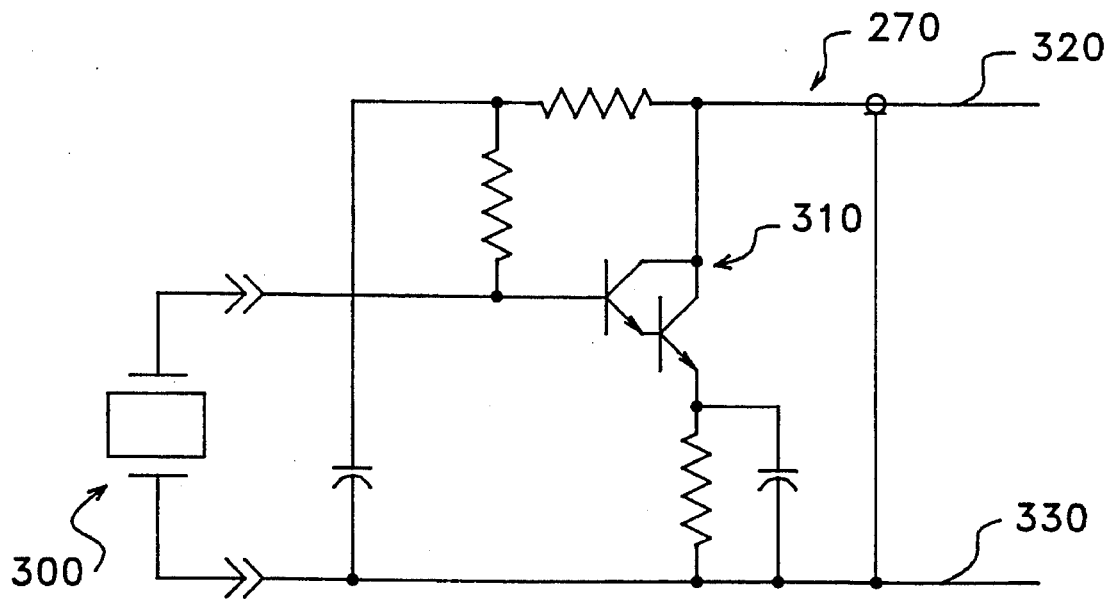
FIG. 14 is a detailed schematic showing of the screen impact detector of FIG. 13.

FIG. 13 is a schematic showing of screen impact detector 270 of FIGS. 10 and 11, as well as the electronic means that responds to the arrival of an arrow at screen 140 to thereupon freeze the impacted screen image and momentarily energize IR source 160. As shown in FIG. 14, impact detector 270 comprises a piezoelectric member 300 of noncritical construction that detects the arrival of an arrow 200 (see FIG. 12) anywhere on the front surface 170 of screen 140. Upon detection of an arrow impact, a signal is provided to transistor amplifier circuit 310, whereupon a signal is introduced into leads 320 and 330 of a shielded cable pair that extends between screen 140 and IR source 160 by placing amplifier 310 within inches of piezoelectric wafer 300, a higher signal level is created with greater noise immunity. While not critical to the invention, it is preferable to physically locate the electronic means shown in FIG. 13 within housing 130 of FIGS. 10 and 11.

Figure 17:
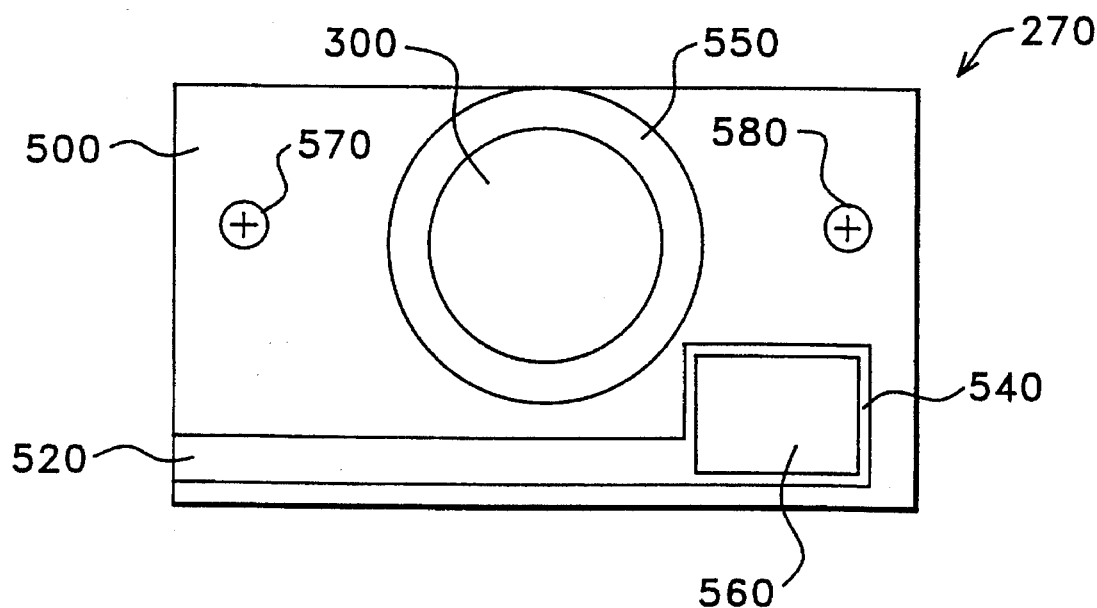
FIG. 17 is a vertical plan view of one arrangement of an arrow impact sensing detector board shown in FIGS. 10 and 11.

FIG. 17 illustrates one configuration for impact detector 270 which was constructed of a relatively thin single, or double copper clad circuit board 500. By conventional processes, channel 520 and terminal section 540 are etched or routed out on board 500. Section 540 accommodates mounting of a module 560 including the amplifier circuits of FIG. 14. Another module composed of a copper segment 550 and a piezoelectric crystal wafer 300 is mounted, or bonded, as a unit on the surface of board 500. Only the peripheral edge of wafer 300 is attached to the sensor assembly, thus allowing the center portion of wafer 300 to float. In this way, sensitivity to screen movement is improved. Board 500 is further adapted by means not shown for appropriate electrical circuit connections, including sensor leads attached to wafer 300 and leads 320 and 330 coupled into the connector cable.

Board 500 is attached to target screen 140 so that the plane of piezoelectric crystal wafer 300 is in contact with the screen surface, or at least generally parallel to the plane of the screen. For instance, screws through holes 570 and 580 can attach board 500 to the bottom seam of screen 140. Therefore, the impact of an arrow on the screen stresses piezoelectric crystal wafer 300 causing it to produce an electric pulse as the output signal from detector 270, provided it meets the threshold criteria discussed below.

The output of impact detector 270, FIG. 13, is provided to a pulse sensor threshold circuit 340 comprising two operational amplifiers 350 and 360. As is well known, threshold circuit 340 is constructed and arranged so that no output is provided therefrom upon normal movement of screen 140, as from wind, insect impact, and the like.

The output of threshold circuit 340 is provided to a single shot multivibrator 370. Multivibrator 370, when triggered by the output of threshold circuit 340, provides an output signal having about a 1/10 second time duration. This output signal controls a field effect transistor 380.

The output of FET 380 provides a signal 390 that operates to freeze the arrow impacted scene on screen 140, in the manner above described. In addition, the output of FET 380 provides a control input to FET 430. FET 430 now operates to control a power transistor 400, and thereby energize IR source 160 by way of conductor 410.

As a result, IR source 160 is energized for a short interval of time (for example, 1/10th second), and the full surface 170 of screen 140 is momentarily illuminated with uniform intensity light of the IR spectrum. This IR light is now reflected from the reflective disk 260 of the arrow (see FIG. 12), in a direction back toward housing 130. In this manner, the position of impact of the arrow on screen surface 170 is momentarily illuminated. While this reflected IR radiation is not visible to the archer, it is detected by IR detector 210 in the manner above described. This detection of the arrow hit position on screen 140 is then used to project a hit position on the frozen scene, thus indicating to the archer the accuracy of the arrow hit on the scene. It should be noted that a means, not shown, can be provided to selectively turn on source 160 during calibration of the archery practice system.

Figure 15:
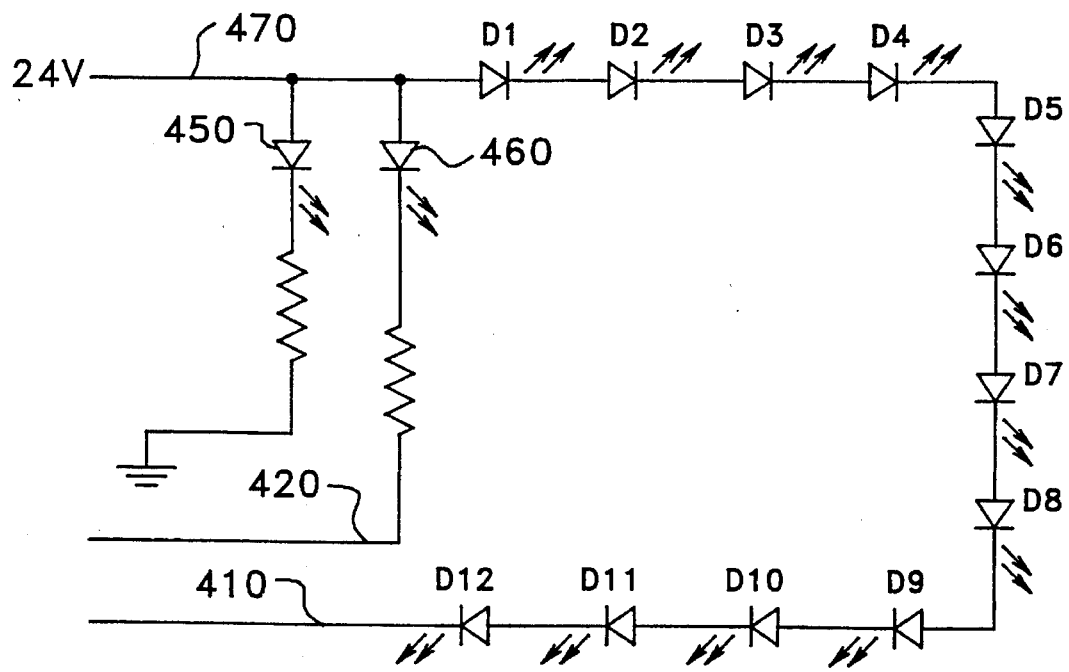
FIG. 15 is a detailed schematic showing of the IR source of FIG. 13, comprising twelve individual, series connected, light emitting diodes.

FIG. 15 is a detailed schematic showing of a preferred form of IR source 160 shown in FIG. 13. Source 160 comprises twelve individual, series connected, Light-Emitting Diodes (LED) that are identified as D1–D12. Current flow through series wired LEDs D1–D12 is controlled by current regulator circuit 400 of FIG. 13. Since the light that is generated by these LEDs is proportional to the current through the series string, regulator 400 insures that power line voltage changes do not effect the intensity of light that is emitted by the LEDs.

FIG. 15 also shows an LED 450 that emits green light, and an LED 460 that emits red light. Green LED 450 is energized so long as conductor 470 of FIG. 13 is provided with 24 volts DC from a power supply. Thus, green LED 450 indicates a power on condition. Red LED 460 is energized by transistor 480 and conductor 420 of FIG. 13. Thus, LED 460 is momentarily energized and indicates the time duration during which the twelve LEDs D1–D12 of IR source 160 are energized. The circuit that drives red LED 460 is also a current monitoring circuit that turns on only if current flows through the string of LEDs D1–D12. Should one of these LEDs become defective, red LED 460 will not turn on.

Figure 16:
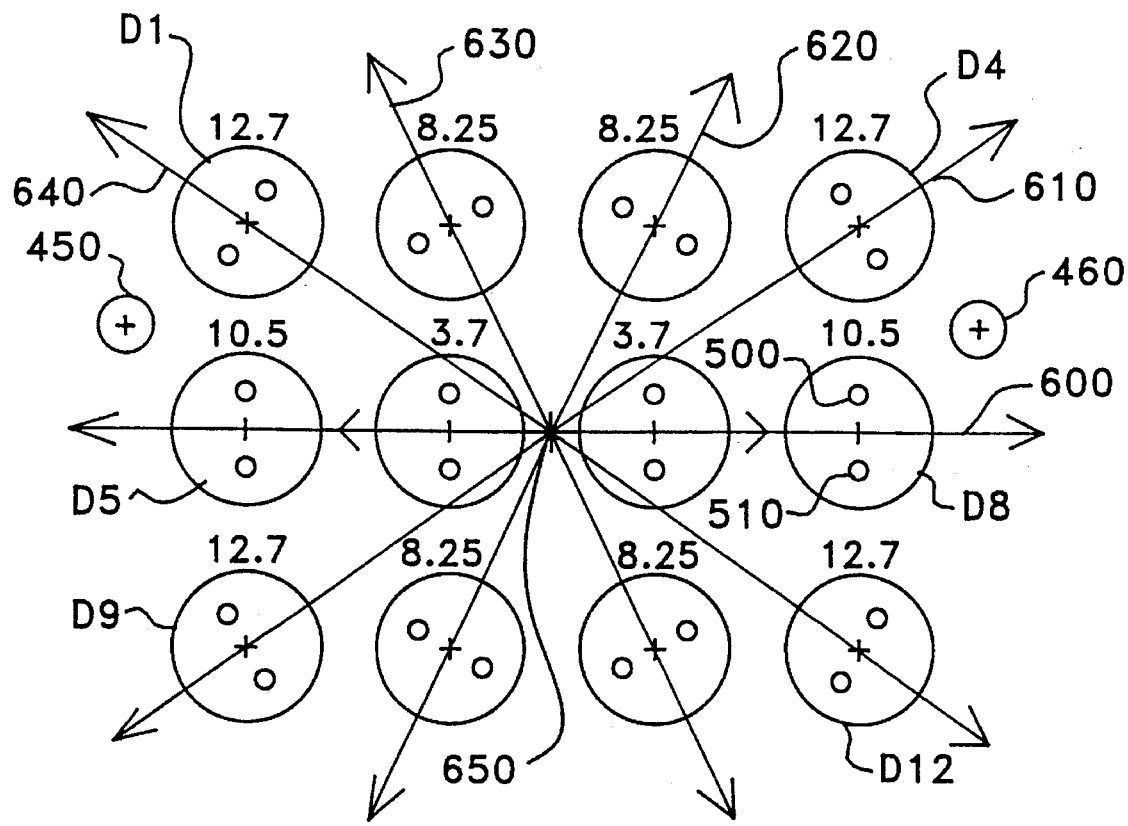
FIG. 16 is a showing of the physical positioning of the twelve LEDs of FIG. 15 in a vertical plane, as these LEDs are viewed from the screen of FIGS. 10 and 11.

FIG. 16 is a showing of the physical positioning of the twelve IR emitting LEDs D1–D12, green emitting LED 450, and red emitting LED 460, as these LEDs are arranged on a flat circuit board that extends in a generally vertical plane. FIG. 16 is a view of this vertically planar circuit board taken from the vertical screen 140 of FIGS. 10 and 11. As can be seen from FIG. 16, each LED comprises a pair of current flow electrodes 500 and 510.

FIG. 16 is a vertical plane view of the twelve LEDs that contains five 72-degree spaced axis lines 600–640 along which the LEDs are aligned. That is, LEDs D5–D8 are aligned on axis 600, LEDs D4 and D9 are aligned on axis 610, LEDs D10 and D3 are aligned on axis 620, LEDs D11 and D2 are aligned on axis 630, and LEDs D12 and D1 are aligned on axis 640. As shown, the LEDs are rotated so that a line joining their respective electrodes 500,510 is perpendicular to the axis upon which each of the LEDs is located.

In order to provide even, uniform, illumination of the full surface 170 of screen 140 by LED array D1–D12, each of the LEDs may be tilted along its respective axis 600–640, and in a direction away from axis origin 650 by an average of 7 degrees. As shown in FIG. 16, in an embodiment of the invention, LEDs D1, D4, D9 and D12 were tilted about 12.7 degrees away from axis origin 650, LEDs D2, D3, D10 and D11 were tilted about 8.25 degrees away from axis origin 650, LEDs D5 and D8 were tilted about 10.5 degrees away from axis origin 650, and LEDs D6 and D7 were tilted about 3.7 degrees away from axis origin 650.

The CCD camera mounted on the floor is typically tilted up by about 11-degrees to position the center axis of the camera on the center of the target screen. The angled alignment causes the camera to view the flat screen with some distortion. The tilted perspective view causes the upper part of the screen to appear narrower than the bottom of the screen, since the top is farther away from the camera than the bottom. The left and right edges of the screen will, therefore, appear at different positions on the camera light sensor as it scans from left to right on the screen. Unless it is corrected, the distortion will cause errors in determining the position of an arrow as it strikes the target relative to the screen. The trapezoid distortion is believed consistent for many camera types, so a single scheme is useful for all installations to correct for the errors. Accordingly, these errors are corrected by the computer program through conventional techniques before directing the arrow hit display on the screen.

Figure 18:
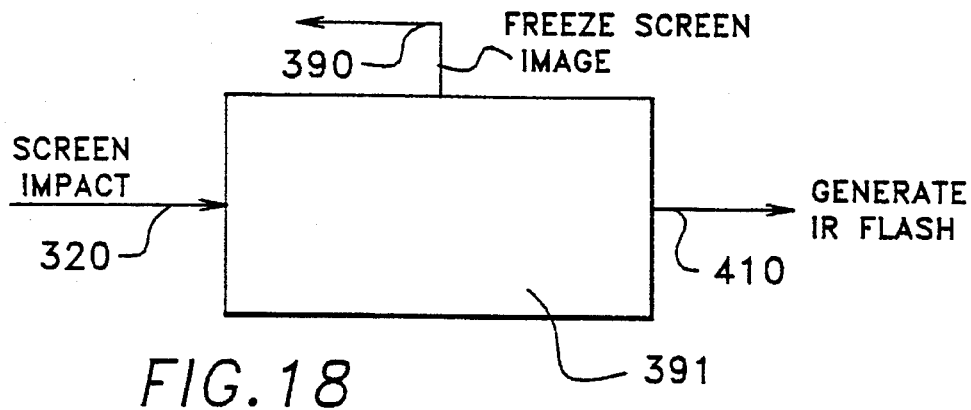
FIG. 18 is a simplified showing of the invention of FIGS. 10–17.

FIG. 18 is a simplified showing of the invention above described relative to FIGS. 10–17. In FIG. 18, a physical screen impact by an arrow is indicated by the presence of a signal 320 that is provided as an input to signal processing network 391. Network 391 response to the occurrence of signal 320 by generating a first output signal 390 that operates to freeze the hit hunt image on the screen for viewing by the archer. Network 391 also generates a second output signal 410 that operates to generate a momentary flash of IR radiation on the full surface of the screen, thus illuminating the arrow at the arrow's screen impact position. As a result, IR is reflected from the arrow, a full screen IR camera operates to provide a full screen image that is analyzed to determine the X-Y coordinates of the arrow impact on the screen, and an image of the arrow hit is then projected on the screen at the calculated X-Y coordinate position for viewing by the archer relative to the frozen hunt scene or image.

Figure 19:
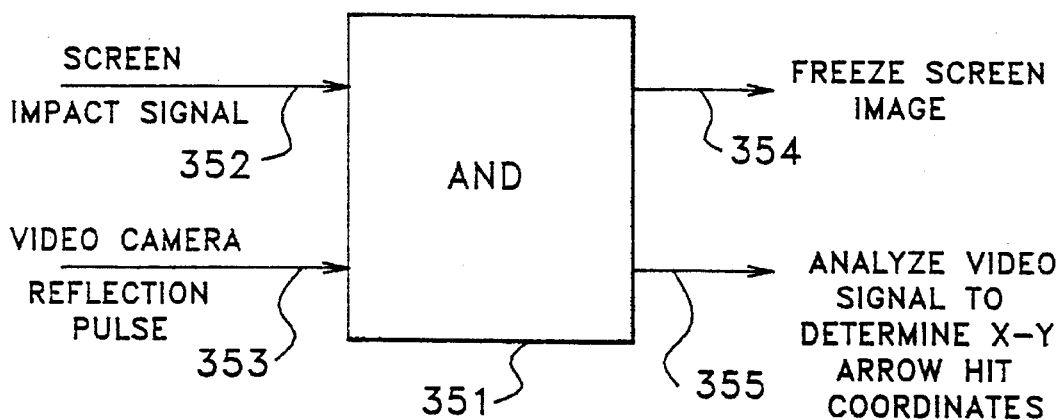
FIG. 19 shows a feature of the invention whereby an arrow shot at the screen is sensed by both a screen impact detector and reflection from the arrow.

FIG. 19 shows a feature of the invention whereby an arrow shot at the screen is redundantly sensed, both by a screen impact sensor and by reflection from the arrow tip as the arrow approaches the screen or impacts the screen. In this arrangement, the overall system control means is enabled to interpret whether both a video hit signal and screen impact signal occurred in the same relatively short time interval. While this feature will be described relative to the ANDing of these two signals to freeze the hit image, display the arrow hit location, and update the archer's score, it is within the spirit and scope of the invention to provide a wide variety of different operational modes in response to one or both of these signals. For example, if a screen impact signal occurs without a video hit signal being generated, a different image may be displayed on the screen for viewing by the archer, and the archer's score is not changed. If a video hit signal occurs without a screen impact signal being detected, the archer may be given a second chance to shoot at the same hunt image without changing the archer's score, and/or a variety of messages can be projected on the screen in response to the presence of only one of these signals.

This feature of the invention, an ANDing function, is provided whereby both physical impact of the screen by an arrow and IR reflection from an arrow reflector must be detected before the hit image is frozen on the screen, and before the full screen video output of the video camera is analyzed to determine the X-Y screen coordinates of the arrow hit. Stated in another way, this feature of the invention provides redundant checking of the arrival of an arrow at the screen by ANDing the output of a screen impact detector with the arrow refection pulse output signal from a full screen video camera.

This feature of the invention is shown in FIG. 19 wherein an ANDing circuit 351 receives (1) an input 352 comprising the output of a screen impact detector that has been processed to determine that an arrow has in fact hit the screen, and (2) an input 353 comprising the output from a video camera that has been processed to determine that an IR reflection flash has been generally simultaneously received from an arrow reflector. When circuit 351 verifies that both signal 352 and signal 353 indicate the arrival of an arrow at the screen, or adjacent to the screen, then (1) output 354 operates to freeze the hit image on the screen, and (2) output 355 initiates the calculation or determination, in a well-known manner, of the X-Y screen coordinates of the arrow hit by analyzing the full screen video image that is provided by the video camera.

Figure 20:
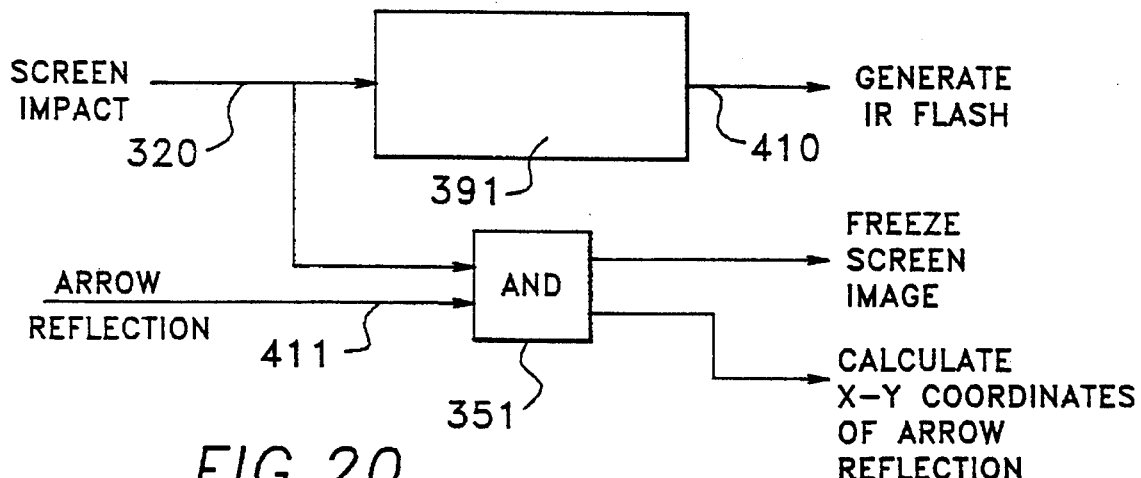

FIG. 20 shows a feature of the invention that combines the concepts of FIGS. 18 and 19. In FIG. 20, signal processing network 391 responds to screen impact signal 320 by generating an output signal 410 that operates to generate a full screen flash of IR radiation, thereby momentarily illuminating the arrow at the arrow's X-Y screen impact position. This arrow impact signal 320 is also provided to an ANDing circuit network 351 that responds to the generally simultaneous presence of signal 320, and an IR reflection signal 411 that is received from the arrow as a result of the arrow's above-mentioned momentary IR illumination. ANDing circuit network 351 now operates to (1) freeze the hit hunt image on the screen for viewing by the archer, and (2) initiate the analysis of the full screen IR image that was captured by the video camera, thus enabling calculation of the arrow's X-Y screen impact position. This X-Y screen impact calculation enables the projection of an arrow hit symbol on the screen at the arrow's X-Y screen impact position for viewing by the archer along with the frozen hunt image.

It will be understood that the three events represented by (1) screen impact signal 320, (2) the flash of IR radiation on the screen that is caused by output signal 410, and (3) arrow reflection signal 411, occur in serial time sequence. Thus, it is necessary that AND circuit network 351 include a form of delay, or memory, that provides a time window of relatively short duration in which the screen impact signal first occurs, followed a short time thereafter by the occurrence of arrow reflection signal 411.

Figure 21:
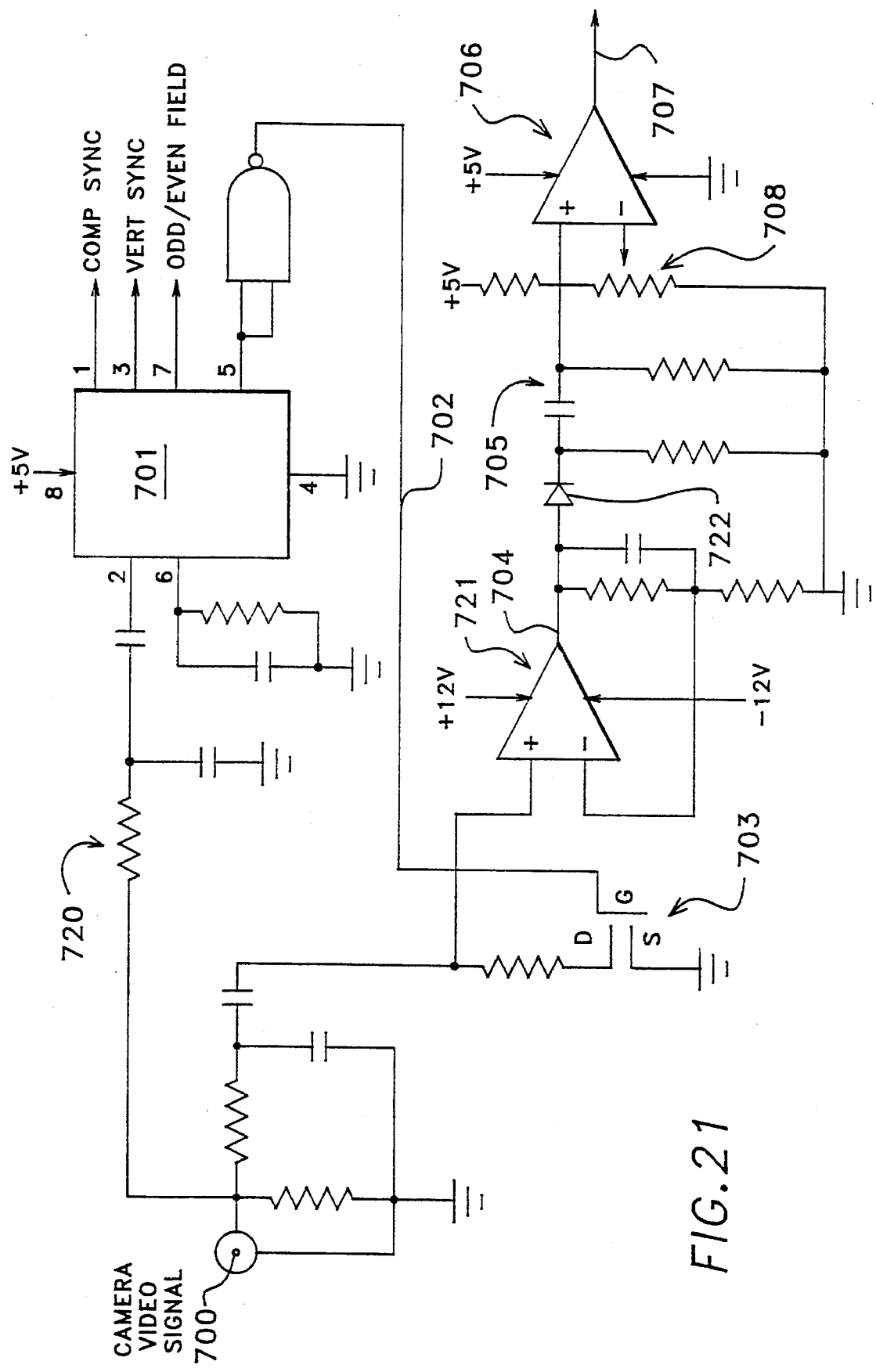

FIG. 21 shows a preferred circuit for responding to the video signal 700 from the full screen video camera, and for generating an arrow hit signal, or pulse 707, corresponding to 353 of FIG. 19 and 411 of FIG. 20. As stated previously, video signal 707 from the full screen video camera, upon the occurrence of an IR reflection from an arrow, generally comprises a large area of a low magnitude signal that is surrounded by a higher magnitude signal pulse corresponding to IR that is reflected from the arrow tip or leading end. The magnitude of this low magnitude background signal may vary throughout the screen area, depending upon the presence and intensity of stray room light, and the like, that may be illuminating various parts of the screen.

In a well-known manner, the video signal that is provided (for example, by a CCD video camera) is coupled to the system control circuit means, or computer using a 75 ohm coaxial cable. The signal on this cable comprises a black and white NTSC video signal. This cable is terminated using a 75 ohm resistor, and provides a terminating video signal 707 having a peak-to-peak level of about 1.0 volts, wherein picture information has a level less than about 0.7 volts, the remaining 0.3 volts containing horizontal and vertical sync information.

The circuit configuration of FIG. 21 operates to minimize the effect of stray screen illumination on the detection of an arrow reflection pulse from the camera's full screen video signal image 700 by looking for a sudden light level change relative to the specific background light level in the area of the arrow's reflection. The arrow reflection is thus rendered independent of any extra light that may be on the screen at this arrow position, and is only dependent upon the amount of light that is sent to the video camera from the arrow's reflector.

In this circuit, full screen video signal 700 from the camera is AC coupled to sync separator integrated circuit chip 701 (preferably a National LM 1881 IC) having pins 18, as shown. A low-pass RC filter 720 is located prior to IC 701 for the purpose of preventing any radio frequency signals from nearby transmitters, such as cordless telephones, from interfering with video signal 700. IC 701 operates to extract all sync information from video signal 700, and ignores all picture information that is in signal 700.

The output at IC pin 5 turns on at the beginning of each horizontal sweep of the camera just before valid picture information begins. This "back porch" signal 702, which has no picture information in it, is sent to the gate of FET switch 703. Signal 702 provides the necessary timing to establish a dark reference signal, or DC reference signal, for the video signal that is sent to an amplifier 721 having a gain of about 10. By thus clamping video signal 700 to ground each time pulse 702 occurs, a dark reference signal is generated for that horizontal camera sweep or scan.

As a result, the picture information signal at conductor 704, having a maximum voltage swing of about 10 volts peak to peak, is shifted so that only picture information is above ground potential, all sync information being forced below ground. The dark level of valid picture information at conductor 704 is about 0.6 volts above ground, and all sync information is more negative than 0.6 volts. By passing signal 704 through diode rectifier 722, having a voltage drop of about 0.6 volts, all of the sync information in signal 704 is removed.

In a screen area that corresponds to an arrow hit, picture information signal 704 contains both an arrow hit reflection flash and background light that may be picked up by the camera from this portion of the screen. In order to separate a narrow signal pulse corresponding to an arrow reflection flash from the screen's background light, a high-pass filter 705 is used at the input of a high-speed voltage comparator 706. Voltage comparator 706 operates to determine whether the output signal from high-pass filter 705 exceeds a minimum threshold, and provides an output signal 707 when this threshold is exceeded.

Filter 705 rejects the slow-changing video signals that are associated with screen background light, and amplifies the reflection pulse signal that is produced by IR reflected from an arrow. Comparator 796 operates to provide an output 707 only when the output of filter 705 exceeds a given level, as is determined by potentiometer 708. Potentiometer 708 provides a means for setting a variable threshold for arrow reflection sensitivity. Output signal, or hit pulse 707, corresponds to signal 353 of FIG. 19 and to signal 411 of FIG. 20.

Calculation of the screen's X-Y coordinates of an arrow hit is conventional. For example, hit pulse 707 from comparator 706 can be used to stop two strings of digital counters, not shown. The content of one counter is then used to provide X position information, as the second counter provides Y position information. Both of these counters begin counting when the video camera begins screen scan at the upper left corner of the screen. One counter counts vertical camera lines from the top to the bottom of the screen, while the other counter counts pixels (picture elements) from left to right of the screen. The digital count that is frozen in the counters is thus a measure of a screen X-Y position corresponding to a reflection from an arrow reflector.

An embodiment of screen 140 as shown in FIGS. 10 and 11 comprised of a front disposed polyester/nylon mesh fabric that was spring mounted about its four sides to present a somewhat resilient vertical surface for arrow impact. The above-mentioned impact sensor was mounted on the mesh fabric adjacent to its bottom edge. A four layer fabric pad was hung only from its top edge and was disposed generally immediately behind the mesh fabric. This four layer pad provides a highly reflective surface and absorbs the arrow's impact force, thus causing the arrow to stop and drop vertically down in front of the mesh fabric. The four layer pad comprised a front disposed, reflective, tightly woven, white polyester fabric that was backed by three layers of duck canvas, these four layers being joined at the four edges thereof, as by sewing.

While the preferred embodiments of the present invention are described herein with particularity, those having normal skill in the art will recognize various changes, modifications, additions and applications other than those specifically mentioned herein without departing from the spirit of this invention.

What is claimed is:

1. A method providing archery practice simulating a dynamic target scene as in an animal hunt, wherein an arrow is shot toward a screen, comprising the steps of:

providing a screen having a front and a back;

providing an arrow having a tip, wherein penetration of said screen by said arrow tip is avoided when said arrow tip hits said screen;

projecting target scenes in sequence on said front of said screen for viewing as a dynamic target by an archer;

determining an arrow hit location relative to said screen showing a first target scene using said arrow shot by the archer;

permitting said arrow to fall from said screen between the archer and said front of said screen; and informing the archer of said arrow hit location.

2. A method as claimed in claim 1 including the step of:

providing means at said screen for stopping said arrow by absorbing impact due to said arrow.

19

3. A method, as claimed in claim 1, wherein:

said step of providing said screen includes holding said screen in place under tension using spring means.

4. A method, as claimed in claim 1, wherein:

said step of determining includes comparing said arrow hit location with said first target scene after said shooting of said arrow.

5. A method, as claimed in claim 1, wherein:

said step of determining includes ascertaining accuracy of said arrow hit location relative to said first target scene.

6. A method, as claimed in claim 1, including the steps of:

providing a triggerable, intermittent, source of radiation of a given wavelength that is not within a wavelength range extending from about 400 nm to about 700 nm, said source being spaced from said front of said screen, and said source being operable when triggered to provide full screen illumination of said front of said screen;

providing an arrow arrival detector associated with said screen and operable to provide an output signal upon an arrow arriving at said front of said screen;

connecting said detector output signal in controlling relation to said source, to thereby trigger said source and provide full screen illumination of said front of said screen upon the detection of an arrow arriving at said front of said screen;

providing an arrow that is capable of reflecting radiation of said given wavelength;

providing a detector that is sensitive to radiation of said given wavelength; and positioning said detector to receive radiation reflected from said arrow.

7. A method, as claimed in claim 1, wherein:

said step of informing includes freezing said first target scene on said screen for viewing by the archer.

8. A method, as claimed in claim 7, wherein:

said step of informing includes indicating said arrow hit location on said screen for viewing by the archer along with said first target scene.

9. Apparatus for simulating a moving hunt scene for an arrow shot by an archer, comprising:

a screen having a front and a back;

means projecting a sequence of visual frames comprising said moving hunt scene onto said front of said screen for presenting at least one hunt object visible to the archer;

means for determining an arrow hit location relative to said screen showing a first visual frame using an arrow shot by the archer; and means for informing the archer of said arrow hit location;

wherein said screen is constructed and arranged to avoid penetration thereof by the arrow and the arrow falls from said screen between the archer and said front of said screen.

10. An apparatus, as claimed in claim 9, wherein:

said screen includes means for stopping the arrow by absorbing impact due to the arrow.

11. An apparatus, as claimed in claim 9, wherein:

said screen includes a plurality of separate layers.

12. An apparatus, as claimed in claim 9, wherein:

said front of said screen includes a flexible sheet facing the archer for producing said visual frames.

13. An apparatus, as claimed in claim 12, wherein:

said back of said screen includes a pad parallel to said flexible sheet and in backing relation to said sheet for absorbing impact of the arrow shot by the archer.

20

14. An apparatus, as claimed in claim 9, wherein:

said front of said screen includes a flexible sheet formed by an open mesh first layer facing the archer and a solid second layer.

15. An apparatus, as claimed in claim 14, wherein:

said back of said screen includes a pad and solid second layer positioned between said pad and the archer.

16. An apparatus, as claimed in claim 9, further including:

an arrow having an arrow tip with a front face, said front face having a shape that avoids penetration of said screen by said arrow tip.

17. An apparatus, as claimed in claim 9, further including:

an arrow having an arrow tip that is removable from remaining portions of said arrow and said arrow tip is reconnectable to said arrow.

18. An apparatus, as claimed in claim 9, wherein:

said means for determining includes means for comparing said arrow hit location with said first visual frame.

19. An apparatus, as claimed in claim 9, wherein:

said means for determining includes means for ascertaining accuracy of said arrow hit location relative to said first visual frame.

20. An apparatus, as claimed in claim 9, wherein:

said means for informing includes means for freezing said first visual frame on said screen for viewing by the archer.

21. An apparatus, as claimed in claim 20, wherein:

said means for informing includes means for indicating an arrow hit location on said screen for viewing by the archer along with said first visual frame.

22. Apparatus providing a visual moving scene toward which an arrow shot by an archer is directed, comprising:

a screen having an imaging and arrow stopping surface;

an arrow having a leading end that is constructed and arranged so as to not penetrate said surface;

means projecting a sequence of visual scenes onto said surface, said sequence of visual scenes presenting at least one moving target for an arrow;

sensing means for sensing the position of an arrow as it approaches said surface and a given scene projected thereon;

determining means responsive to said sensing means for determining an arrow hit location on said surface;

means responsive to said sensing means for freezing said given scene on said surface for viewing by an archer; and means responsive to said determining means for projecting said determined arrow hit location on said surface for viewing by an archer along with said given scene.

23. Apparatus simulating an archery hunt scene having at least one moving object, comprising:

a screen having an arrow stopping surface of a size simulating a hunt area normally viewed by an archer;

an arrow having a nonpenetrating leading end;

means projecting a sequence of visual hunt scene frames onto said arrow stopping surface for viewing by the archer;

sensing means responsive to an arrow approaching said arrow stopping surface for determining a subsequent arrow hit location on said arrow stopping surface;

means responsive to said sensing means for freezing a visual hunt scene frame on said arrow stopping surface for viewing by the archer; and means responsive to said sensing means for projecting said determined arrow hit location on said arrow stopping surface for viewing by the archer.

24. The apparatus of claim 23, wherein said screen includes a reflecting surface and an impact absorbing backing material.

25. The apparatus of claim 24 wherein said sensing means comprises:

a continuous full screen field of electromagnetic radiation of a given wavelength that is outside of a wavelength range that extends from about 400 nm to about 700 nm, said field of electromagnetic radiation being spaced in front of said reflecting surface; and a detector that is sensitive to electromagnetic radiation of said given wavelength, said detector being positioned to receive electromagnetic radiation reflected from an arrow as said arrow penetrates said field of electromagnetic radiation.

26. The apparatus of claim 25, wherein said field of electromagnet radiation is spaced about 0.5 inches in front of said reflecting surface.

27. The apparatus of claim 23 wherein said screen includes impact absorbing means for stopping said arrow by absorbing the impact thereof.

28. The apparatus of claim 27 wherein said screen includes a flexible image reflecting sheet facing the archer, and an impact absorbing pad in backing relation to said sheet.

* * * * *